United States Patent
Matsuo et al.

(10) Patent No.: US 6,571,015 B1
(45) Date of Patent: May 27, 2003

(54) METHOD FOR COMPRESSING IMAGE INFORMATION AT HIGH SPEED AND METHOD FOR TRANSFERRING REAL-TIME MOVING IMAGES UTILIZING THE SAME

(75) Inventors: Katsunori Matsuo, Fukuoka (JP); Seiichiro Kamata, Fukuoka (JP)

(73) Assignee: Kyushu Electronics System Inc., Fukuoka (JP)

( * ) Notice: Subject to any disclaimer, the term of this patent is extended or adjusted under 35 U.S.C. 154(b) by 0 days.

(21) Appl. No.: 09/445,719
(22) PCT Filed: Apr. 12, 1999
(86) PCT No.: PCT/JP99/01953
§ 371 (c)(1),
(2), (4) Date: Jan. 3, 2000
(87) PCT Pub. No.: WO00/52936
PCT Pub. Date: Sep. 8, 2000

(30) Foreign Application Priority Data
Mar. 1, 1999 (JP) .......................... 11-053393

(51) Int. Cl.[7] ................................. G06K 9/36
(52) U.S. Cl. ......................... 382/232; 382/235
(58) Field of Search ......................... 382/232, 235, 382/164, 240, 244; 358/1.9; 375/240.19; 709/203, 217

(56) References Cited
U.S. PATENT DOCUMENTS 4,346,402 A * 8/1982 Pugsley ................. 358/523
6,058,211 A * 5/2000 Bormans et al. .......... 382/235
6,151,136 A * 11/2000 Takemoto .................. 358/1.9

OTHER PUBLICATIONS

Kamata et al., "An Address Generator of a Pseudo–Hilbert Scan in Rectangle Region", IEEE International Conference on Image Processing, vol. 1, 1997, pp. 707–710.*

Kamata et al., "An Address Generator of an N–Dimensional Hilbert Scan", IEEE International Conference on Image Processing, vol. 1, 1996, pp. 1031–1034.*

* cited by examiner

Primary Examiner—Anh Hong Do
(74) Attorney, Agent, or Firm—Jordan and Hamburg LLP

(57) ABSTRACT

A method for compressing image information at a high speed and a method for transferring real-time moving images utilizing the same in which scanning of rectangular parallelepiped regions is performed as an extension of three-dimensional Hilbert scanning to improve throughput and to achieve cost reduction. In the method for compressing image information at a high speed, viewed moving images including three dimensional information are converted into one-dimensional serial information one by one using a look-up table associated with rectangular parallelepiped regions in a three-dimensional space, and the converted data is subjected to data compression. In the method for transferring viewed moving images from a server to clients in real-time, data compressed according to the method is transferred through a communication path and the data is decompressed at the clients.

15 Claims, 20 Drawing Sheets

Fig. 1 PRIOR ART
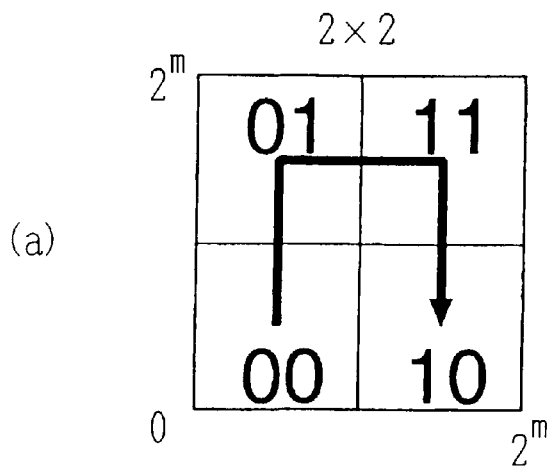
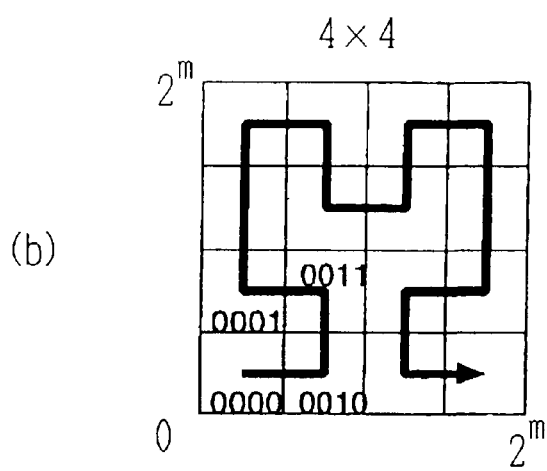
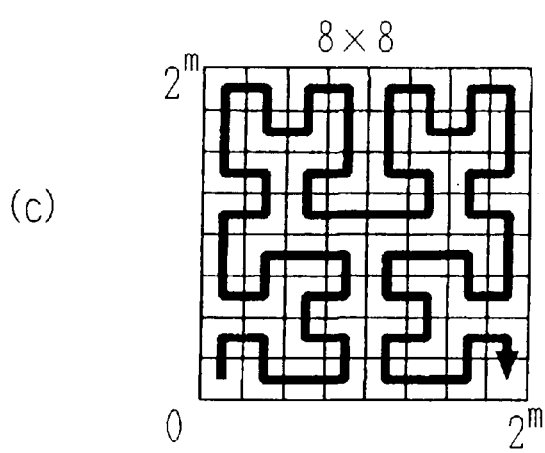

4 × 5 × 6

8 × 8 × 14

8 × 10 × 14

METHOD FOR COMPRESSING IMAGE INFORMATION AT HIGH SPEED AND METHOD FOR TRANSFERRING REAL-TIME MOVING IMAGES UTILIZING THE SAME

TECHNICAL FIELD

The present invention relates to a method for compressing image information at a high speed and a method for transferring real-time moving images utilizing the same that makes it possible to generate dynamic compression and transmission sleds.

BACKGROUND OF THE INVENTION

An example of a group of curves referred to as "space filling curves" is Hilbert curves proposed by D. Hilbert in 1891, and a method for compressing image information using scanning of two-dimensional Peano curve that is similar thereto has been proposed (see JP-B-7-22345).

FIG. 1 is a diagram showing examples of conventional two-dimensional Hilbert curves in which FIG. 1($a$) shows a case of 2×2 pixels; FIG. 1($b$) shows a case of 4×4 pixels; and FIG. 1($c$) shows a case of 8×8 pixels.

Such curves are recently applied to various researches covering classification of spectral images, database information searching, image compression, computer holograms and the like because of their high neighborhood retaining properties. In such applications, Hilbert curves are used for processing data distributed in two-dimensional and three-dimensional spaces. In general, an operation of establishing one-to-one correspondence between lattice points in an N-dimensional space (N=2, 3, . . .) and one-dimensional points is referred to as "scanning", and scanning along a Hilbert curve is referred to as "Hilbert scanning".

Articles on the prior art relating to methods for compressing image information include:

(1) T. Agui, T. Nagae and M. Nakajima, "Generalized Peano Scans for Arbitrary-sized Arrays", ITEJ Technical Report Vol. 14, No. 37, pp. 25–30, July 1990
(2) Y. Bandoh and S. Kamata, "A Method of computing a Pseudo-Hilbert Scan Filling in a Rectangular parallelepiped Region", IEICE Transactions (D-II), Vol. J80-D-II, No. 10, pp. 2864–2867, October, 1997
(3) S. Kamata, A. Perez, E. Kawaguchi, "A Method of Computing Hilbert curves in Two- and Three-Dimensional Spaces", IEICE Transaction (D-II), Vol. J74-D-II, No. 9, pp. 1217–1226, September 1991.
(4) X. Liu, G. F. Schrack, "An Algorithm for Encoding and Decoding the 3-D Hilbert Order", IEEE Trans. Image Processing, IP-6, No. 9, pp. 1333–1337, September 1997

However, the use of Hilbert scanning has a problem in that the range of application is limited to regions in regions in an N-dimensional space that satisfies:

$$\frac{N}{2^{m^x} \ldots \times 2^m} \quad (m \text{ is a natural number})$$

On the contrary, normal Hilbert scanning is frequently inapplicable to normal images in which rectangles are to be scanned. Under such circumstances, scanning methods for rectangular parallelepiped regions have been proposed as generalization of two-dimensional Hilbert scanning (refer to the above-cited articles (1) and (2) on the prior art). The method according to the article (1) on the prior art still has problems associated with computing time and implementation on a hardware basis because it is a method based on a recursive process.

On the contrary, the method according to the article (2) on the prior art proposed by the inventors is a scanning method at a high speed which is an extended version of the article (3) on the prior art including no recursive process. According to the articles (2) and (3) on the prior art, rules for the generation of Hilbert curves are formed into a table in advance, and it is referred one after another to eliminate recursion.

Such generalization of Hilbert scanning has not been considered for three-dimensional applications because of complicated calculations associated therewith. The method according the article (1) on the prior art is generalization of two-dimensional Hilbert scanning, and no specific method for three-dimensional applications is described. The method according to the article (4) on the prior art remains in a computing method in a cubic region ($2^m \times 2^m \times 2^m$), and nothing is mentioned about a case of rectangular parallel piped region. Therefore, the application of Hilbert scanning to three-dimensional spaces has been strictly limited.

However, the generalization of Hilbert scanning in a three-dimensional space can be carried out similarly to that in a two-dimensional space based on the technique according to the article (2) on the prior art.

Under the above-described circumstances, it is a first object of the invention to provide a method for compressing image information at a high speed and a system for compressing image information in which scanning is carried out on rectangular parallelepiped regions (without being limited to three-dimensional Hilbert scanning) as extension of three-dimensional Hilbert scanning to improve throughput and to achieve cost reduction. The utilization of Hilbert curves for scanning of rectangular parallelepiped regions is referred to as "pseudo Hilbert scanning".

In conventional systems for transferring and distributing moving images, moving images compressed at a distributing server in advance have been transmitted with quality and at a speed determined at the server.

FIG. 2 shows an example of a processing flow in such a conventional system in which image signals from a television camera are fetched into a computer at constant intervals with means such as video capture, and the fetched images are subjected to image compression to transmit image data. A personal computer at the receiving end decompresses the compressed images to display an image at each update.

However, conventional methods have had the following problems.

(1) In systems such as a television conference, image quality is inevitably reduced because the priority is given to the number of images per unit time. In distribution systems with high image quality, since images are transmitted after they are compressed at the distributing end in advance, image data going to be transmitted represent the past and therefore lose real-time property.

(2) Conventional software compression techniques are not fast enough to perform real-time image compression.

(3) Image compression on a hardware basis is costly because dedicated equipment is required.

(4) Since no consideration is paid to the performance of clients' end and the conditions of networks, it is not possible to send optimum moving images that meet the requirements of clients.

One reason for such situations is the fact that priority has been given to compression ratios and image quality in conventional compression and decompression techniques over the compression speed because they have been intended for retention and reproduction as typical in the case of DVDs. This has resulted in low compression speeds and has necessitated transmission at the maximum speed. It has therefore been common to sacrifice image quality to speed when moving images are transferred in real-time as in television conference systems.

It is therefore a second object of the invention to achieve the transfer of real-time moving images by compressing and transferring fetched images in real-time, to transfer images optimized for the requirements of clients and the conditions of networks in terms of the image size, the number of images, the intervals (time) between the images and the quality of the images and to generate a compression and transfer sled for each client. This makes it possible to perform optimum transfer of moving images to a plurality of clients under different conditions, to achieve the optimum performance of moving image transfer in adaptation to increased speeds of computers in the future and to achieve transfer of moving images in synchronism with the speed of a network.

DISCLOSURE OF THE INVENTION

In order to achieve the first object, according to the invention, there is provided:

[1] a method for compressing image information at a high speed wherein picked moving images comprising three-dimensional information are converted into one-dimensional serial information one by one using a look-up table associated with rectangular parallelepiped regions in a three-dimensional space and wherein said converted data are subjected to data compression,

[2] a method for compressing image information according to [1], wherein the conversion of the picked moving images into one-dimensional serial information can be performed through three-dimensional pseudo Hilbert scanning,

[3] a method for compressing image information according to [2], wherein rules for recursive division of each side of a rectangular parallelepiped block as the minimum unit for said three-dimensional pseudo Hilbert scanning are defined such that a side having an even length is divided into sides having an even length at a dividing point closest to the mid-point; a side having an odd length is divided into a side having an odd length and a side having an even length at a dividing point closest to the mid-point; and addresses are assigned to the rectangular parallelepiped regions accordingly,

[4] a method for compressing image information according to [2], wherein said data compression is a process of dividing one-dimensional data decompressed through three-dimensional pseudo Hilbert scanning using a threshold,

[5] a method for compressing image information according to [4], wherein said dividing process divides the one-dimensional data into sections that result in the minimum square error from said one-dimensional data and generates compressed data which is linear approximation of each section,

[6] a method for compressing image information according to any of [1] through [5], wherein patterns of differential waveforms between the compressed data and the original data are divided and classified into a plurality of models to prepare error patterns; codes for error patterns that approximate said differential waveforms at the time of data compression are added to the compressed data; and the data are restored by superimposing the waveforms of the error patterns associated with the codes of the relevant error patterns on decompressed data during data decompression,

[7] a system for compressing image information comprising an image pickup device for viewing moving images, three-dimensional pseudo Hilbert scanning means for converting three-dimensional information associated with rectangular parallelepiped regions into one-dimensional serial information, a moving image storage device for storing said one-dimensional serial information and data compression means for compressing data read from the moving image storage device, and

[8] a system for compressing image information comprising an image pickup device for viewing moving images, three-dimensional pseudo Hilbert scanning means for converting three-dimensional information associated with rectangular parallelepiped regions into one-dimensional serial information, a moving image storage device for storing said one-dimensional serial information, data compression means for compressing data read from the moving image storage device, a reversible encoding portion for the compressed data, a transmission path for compressed data from the reversible encoding portion, a reversible decoding portion for the transmitted compressed data, a portion for restoring data from the reversible decoding portion, a second moving image storage device for storing data from the data restoring portion, three-dimensional pseudo Hilbert scanning means associated with the rectangular parallelepiped regions for scanning compressed data read from the moving image storage device and a display device for displaying output moving images.

In order to achieve the second object, according to the invention, there is provided:

[9] a method for transferring viewed moving images from a server to clients in real-time, wherein viewed moving images comprising three-dimensional information are converted into one-dimensional serial information one by one using a look-up table associated with rectangular parallelepiped regions in a three-dimensional space and wherein the converted original data are compressed using a software compression technique and are transferred through a communication path,

[10] a method for transferring real-time moving images according to [9], wherein patterns of differential waveforms between the compressed approximate data and the original data are divided and classified into a plurality of models to prepare error patterns at each of the server and clients; codes for error patterns that approximate the differential waveforms at the time of data compression at the server are transferred to the clients along with the compressed data; and the data are restored by superimposing the waveforms of relevant error patterns on decompressed data during data decompression at the clients,

[11] a method for transferring real-time moving images according to [9] or [10], wherein a look-up table is dynamically generated upon a request from a client,

[12] a method for transferring real-time moving images according to [11], wherein a look-up table is used on which any image size can be specified as requested by a client,

[13] a method for transferring real-time moving images according to [11] or [12], wherein a look-up table is used on which any number of images can be specified as requested by a client,

[14] a method for transferring real-time moving images according to [9], wherein the compression ratio of an image is changed as requested by a client,

[15] a method for transferring real-time moving images according to any of [9] through [14], wherein a specific compression and transfer sled is generated to each request by a client,

[16] a method for transferring real-time moving images according to any of [9] through [15], wherein intervals between images are changed as requested by a client, and

[17] a method for transferring real-time moving images according to any of [9] through [16], wherein management means is provided for processing a request from each of a plurality of clients simultaneously.

BRIEF DESCRIPTION OF THE DRAWINGS

FIG. 1 is a diagram showing an example of a conventional two-dimensional Hilbert curve.

BEST MODE FOR CARRYING OUT THE INVENTION

A mode for carrying out the invention will now be described in detail.

Figure 2:
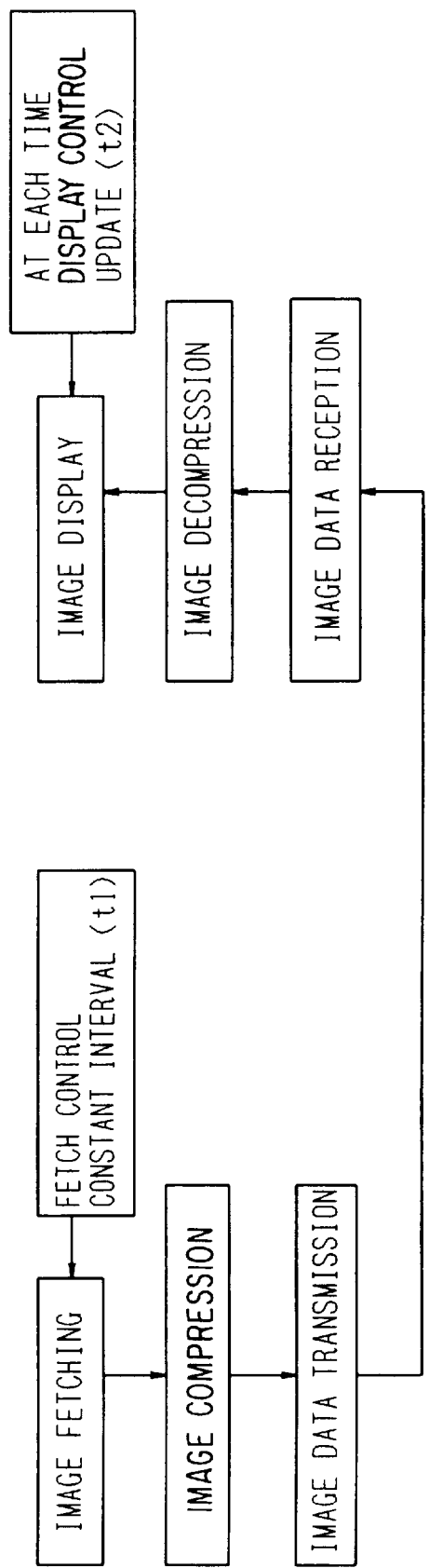
FIG. 2 is a block diagram showing an example of a processing flow according to a conventional method.
Figure 3:
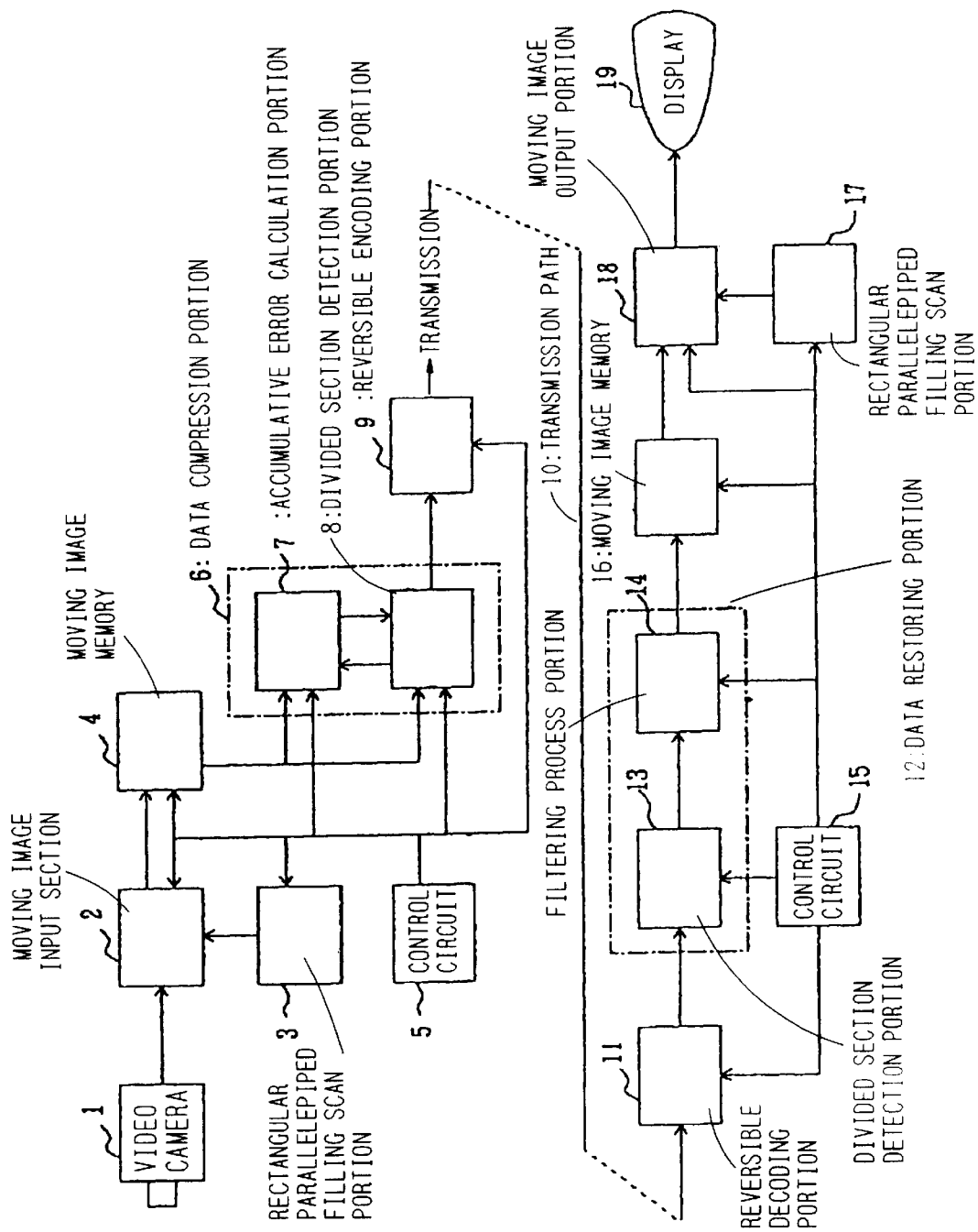
FIG. 3 is a block diagram of a system for compressing image information according to the invention.
Figure 4:
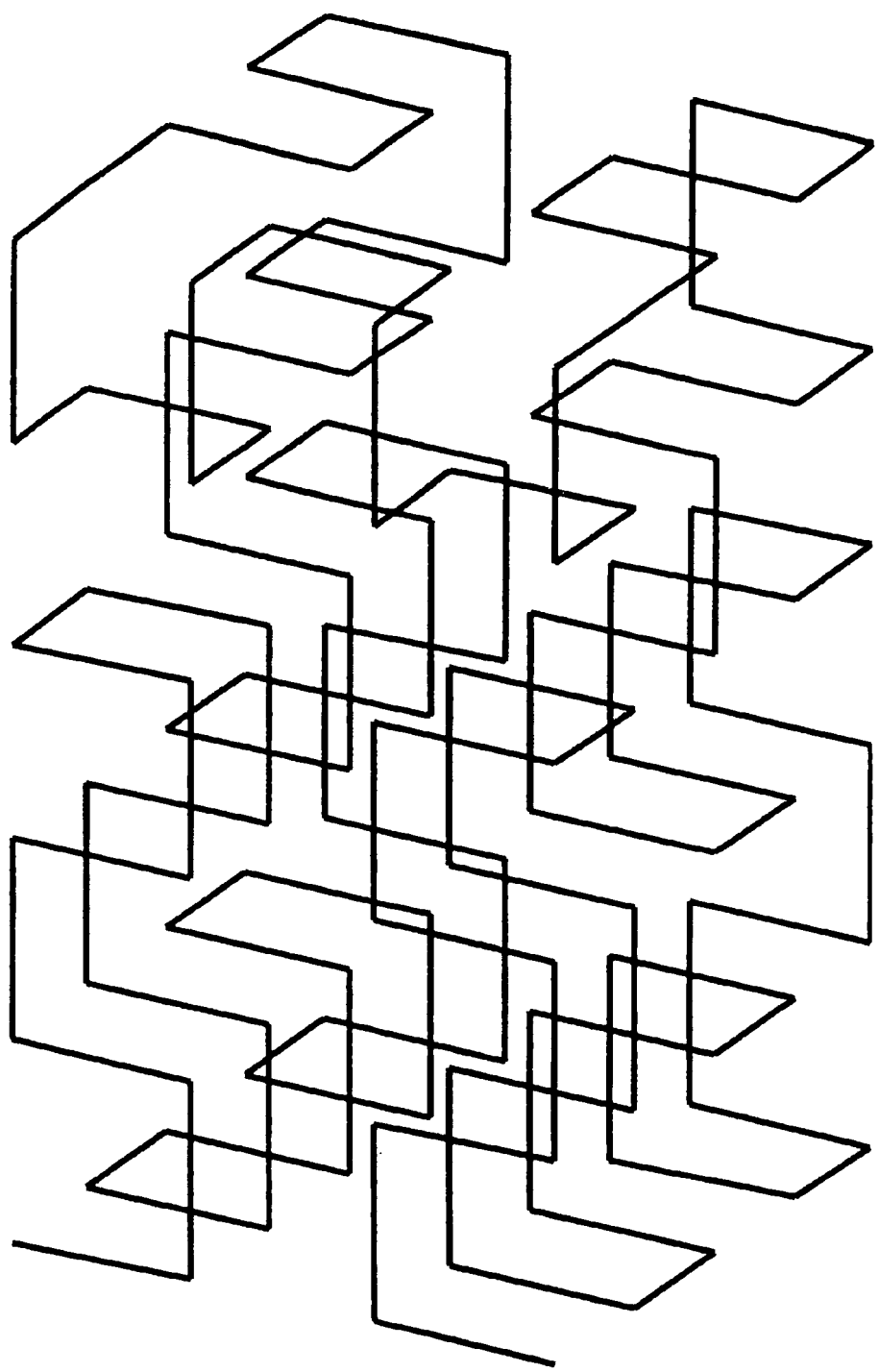
FIG. 4 is a schematic diagram illustrating pseudo Hilbert scanning of a three-dimensional rectangular parallelepiped which is a (first) embodiment of the invention.
Figure 5:
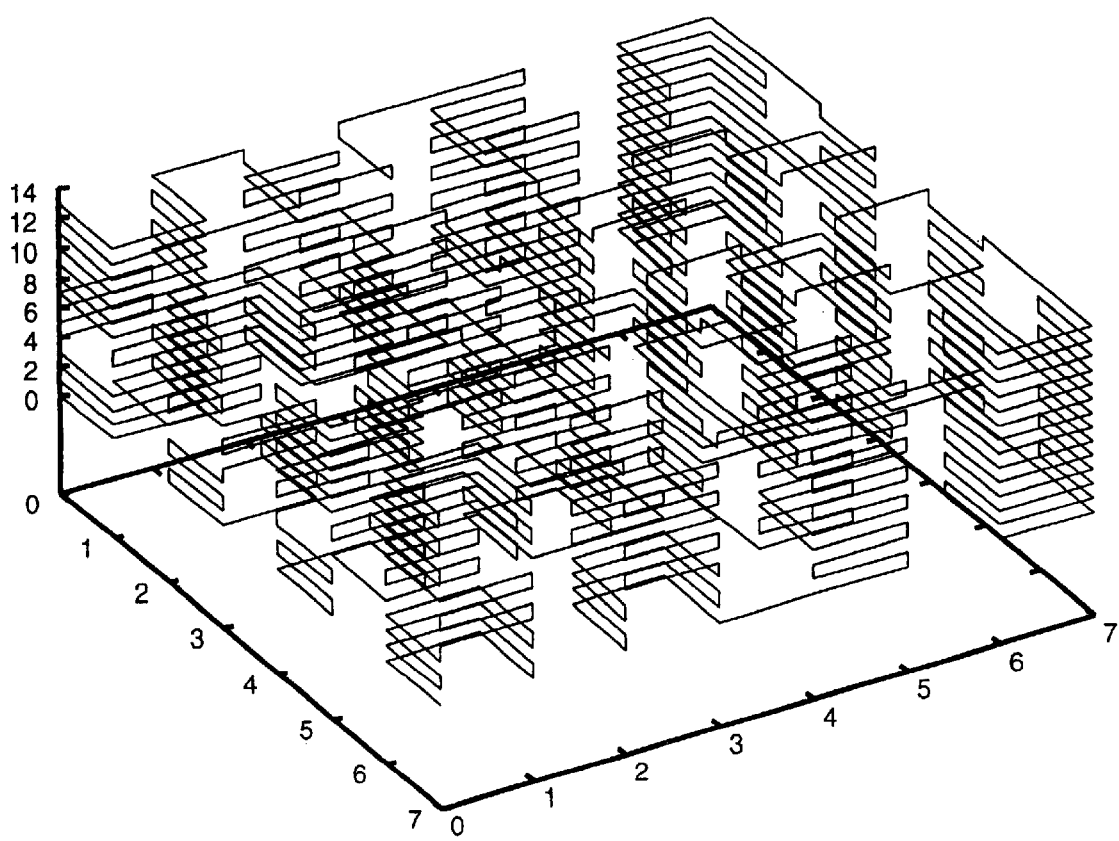
FIG. 5 is a schematic diagram illustrating pseudo Hilbert scanning of a three-dimensional rectangular parallelepiped which is a (second) embodiment of the invention.
Figure 6:
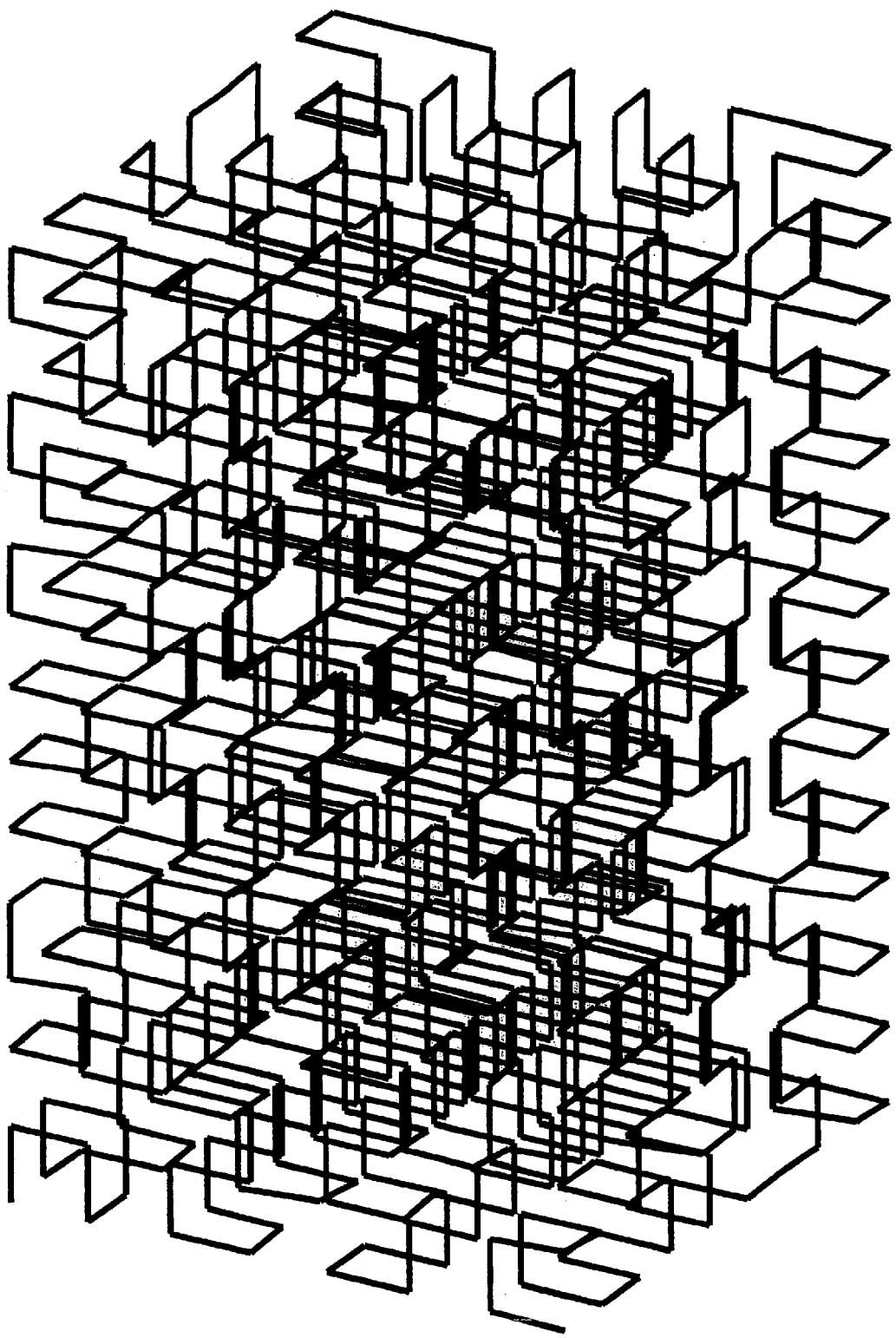
FIG. 6 is a schematic diagram illustrating pseudo Hilbert scanning of a three-dimensional rectangular parallelepiped which is a (third) embodiment of the invention.

FIG. 3 is a block diagram of a system for compressing image information according to the invention, and FIG. 4 is a schematic diagram of three-dimensional pseudo Hilbert scanning which is a (first) embodiment of the invention showing a case of 4×5×6 pixels. FIG. 5 is a schematic diagram of three-dimensional pseudo Hilbert scanning which is a (second) embodiment of the invention showing a case of 8×8×14 pixels. FIG. 6 is a schematic diagram of three-dimensional pseudo Hilbert scanning which is a (third) embodiment of the invention showing a case of 8×10×14 pixels.

In FIG. 3, 1 represents a video camera; 2 represents a moving image input portion; 3 represents a rectangular parallelepiped filling scan portion; 4 represents a moving image memory; 5 represents a control circuit; 6 represents a data compression portion; 7 represents an accumulative error calculation portion; 8 represents a divided section detection portion; 9 represents a reversible encoding portion; 10 represents a transmission path; 11 represents a reversible decoding portion; 12 represents a data restoring portion; 13 represents a divided section restoring portion; 14 represents a filtering process portion; 15 represents a control circuit; 16 represents amoving image memory; 17 represents a rectangular parallelepiped filling scan portion; 18 represents a moving image output portion; and 19 represent a display.

According to the method for compressing image information of the invention, moving images input from the video camera 1 are subjected to three-dimensional pseudo Hilbert scanning carried out by the rectangular parallelepiped filling scan portion 3 at the moving image input portion 2 under centralized control of the control circuit 5 and are converted from three-dimensional information to one-dimensional serial information to be stored in the moving image memory 4. One-dimensional serial information from the moving image memory 4 is sent to the reversible encoding portion 9 by the data compression portion 6 in which the accumulative error calculation portion 7 and divided section detection portion 8 cooperate.

Compressed data from the reversible encoding portion 9 are sent through the transmission path 10 to the reversible decoding portion 11, and the data are restored at the data restoring portion 12 consisting of the divided section restoring portion 13 and filtering process portion 14 under centralized control of the control circuit 15 and are stored in the moving image memory 16. The stored data are subjected to three-dimensional pseudo Hilbert scanning performed by the rectangular parallelepiped filling scan portion 17 to be displayed on the display 19 as moving images through the moving image output portion 18.

For example, the three-dimensional pseudo Hilbert scanning by the rectangular parallelepiped filling scan portion 3 is performed as shown in FIG. 4 in a case of 4×5×6 pixels, as shown in FIG. 5 in a case of 8×8×14 pixels and as shown in FIG. 6 in a case of 8×10×14 pixels.

Principles behind the present invention will now be described in detail one by one.

First, a description will be made on the generalization of Hilbert scanning in a three-dimensional space.

(1) Hilbert Scanning for Filling Rectangular Parallelepiped Regions

A brief description will be made here on a method for Hilbert scanning on cubic regions in a three-dimensional space utilizing two kinds of tables (a terminal table and an induction table) (article (3) on the prior art).

This three-dimensional Hibert scanning is intended for cubic regions that satisfy $0 \leq X < 2^m$, $0 \leq Y < 2^m$ and $0 \leq Z < 2^m$ (m: 1, 2 . . . ) in an X-Y-Z Cartesian coordinate system, and the regions include $2^m \times 2^m \times 2^m$ lattice points.

An address is assigned to each pixel as described below.

Figure 7:
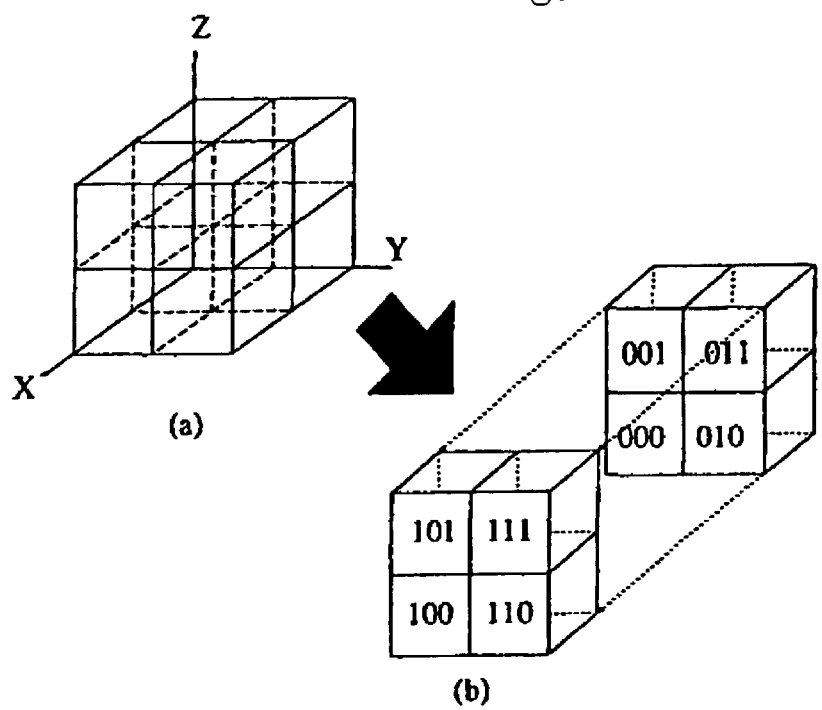
FIG. 7 is a diagram showing the assignment of addresses in eight divided regions.

FIG. 7 is a diagram showing the assignment of addresses to eight divided regions.

As shown in FIG. 7(a), a cubic region is divided into eight sections, and an address is assigned to each of the divided regions as shown in FIG. 7(b). Next, an address is similarly assigned to each of eight regions as a result of further division of each divided region, and each of those regions is represented by six bits added with three low order bits.

Therefore, an address Z of a region having a size of 1×1×1 defined after m dividing operations can be expressed by a binary notation having m bits as shown below.

$$Z = Z_1, Z_2, \ldots, Z_m$$

$$= \underbrace{\overbrace{X_{1,1}\,X_{1,2}\,X_{1,3}}^{3}, \ldots, \overbrace{X_{m,1}\,X_{m,2}\,X_{m,3}}^{3}}_{3m}$$

where $z_i$ (i=1, 2, . . . , m) is a binary number having three bits, and $X_{1,1} \ldots X_{m,3}$ assume a value of 0 or 1 (FIG. 1 shows the assignment of addresses in a two-dimensional instance for reference).

A discussion will now be made on traverses across the eight divided regions shown in FIG. 7 with each region indicated by one representative point. In this case, there are three end points for each of eight starting points, and there are twelve (=8×3/2) combinations of starting points and end points when combinations that are simple reversal of starting and end points are deleted.

Figure 8:
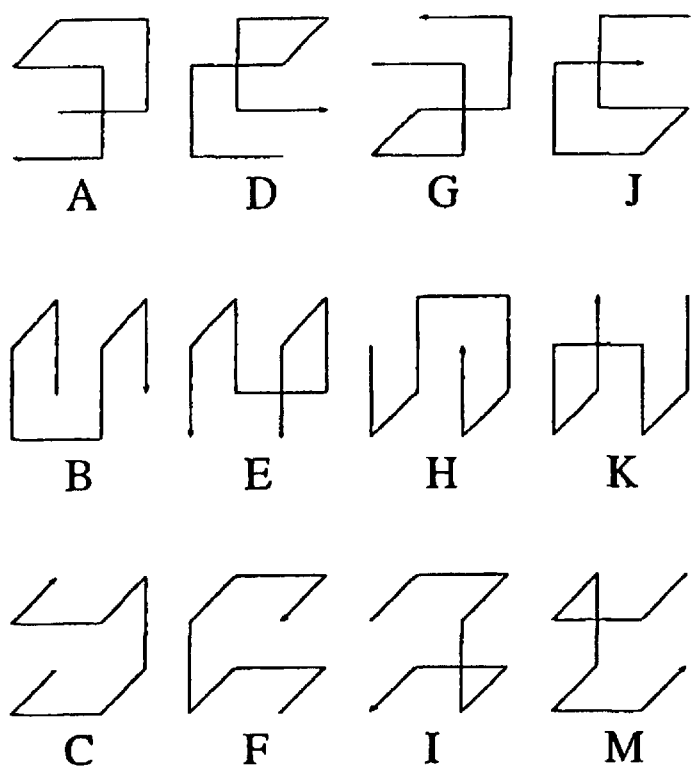
FIG. 8 is a diagram showing Hilbert curves in a three-dimensional space.

Therefore, there are twelve kinds of Hilbert curves used in the invention as shown in FIG. 8. Each alphabet represents the type of a curve. Each of eight divided regions as a result of further division of each of the divided regions is also traversed along any of the twelve kinds of curves A to M.

Figure 9:
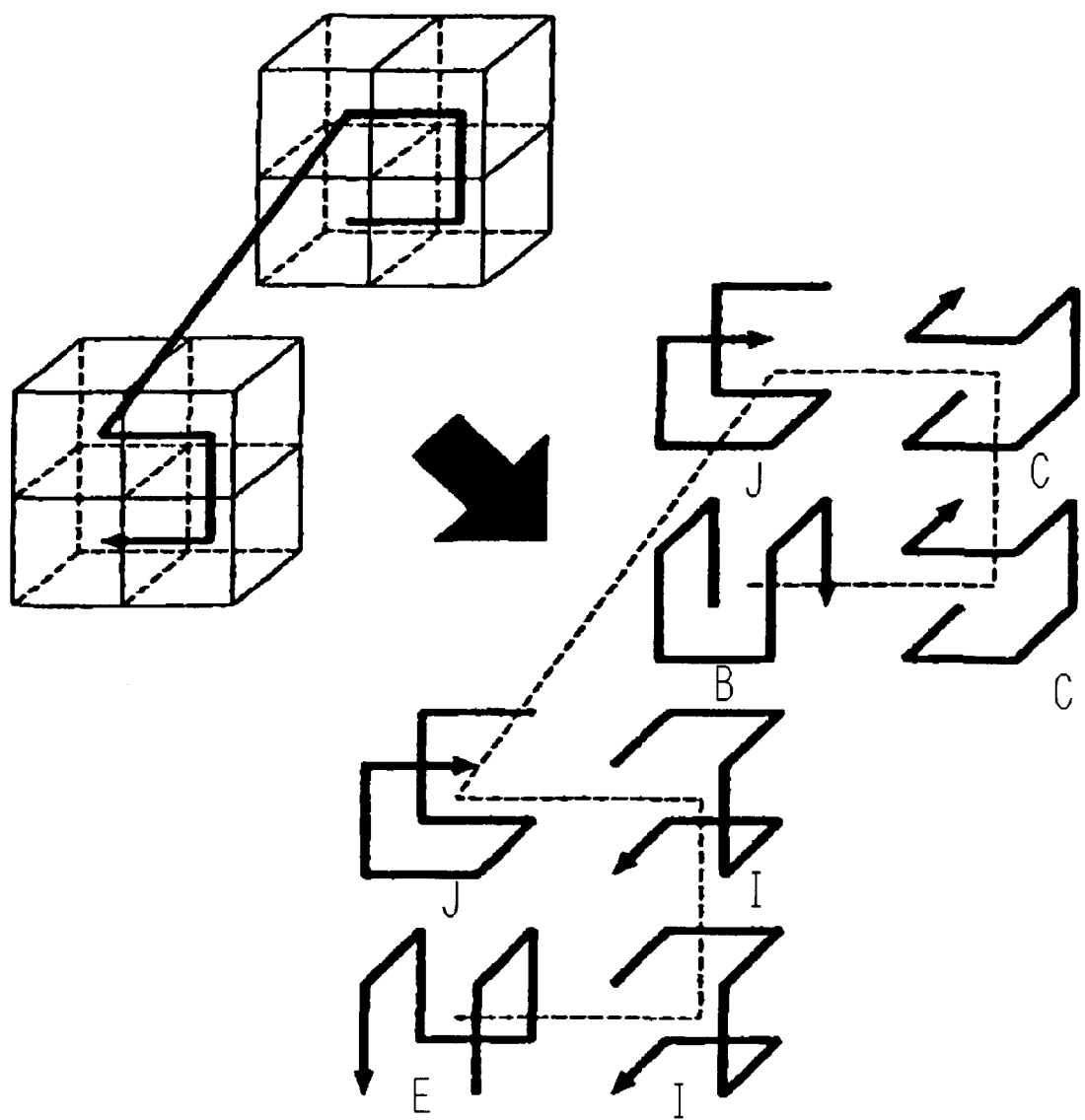
FIG. 9 is a diagram showing a scanning pattern in divided regions.

For example, in the case of the curve A, the eight regions shown in FIG. 7(a) are traversed in the order of 000, 010, 011, 001, 101, 111, 110 and 100, and the types of the Hilbert curves change between each region in the order of B, C, C, J, J, I, I and E as shown in FIG. 9.

The two kinds of information, i.e., address information and the information on the types of curves is respectively stored in a terminal table $T_{trm}[\gamma_j][i'_j]$ and an induction table $T_{ind}[\gamma_j][i_j]$ depending on the types of curves and the order in which they are traversed. Here, $\gamma_j$ (=A, B, . . . , K, M) represents the type of a curve after j times of division, and $i_j$ (=1, 2, . . . 8) represents the order of scanning on eight divided regions after j times of division. For example, for the eighth region scanned by a curve of $\gamma_0$=A, reference is made to $Z_1 = T_{trm}[A][8] = 100$ and $\gamma^1 = T_{ind}[A][8] = E$.

The terminal table ($T_{trm}$) for referring to addresses and the induction table ($T_{ind}$) for referring to the types of curves are shown below.

$T_{trm}[A]=[000,010,011,001,101,111,110,100]$
$T_{trm}[B]=[000,001,101,100,110,111,011,010]$
$T_{trm}[C]=[000,100,110,010,011,111,101,001]$
$T_{trm}[D]=[110,100,101,111,011,001,000,010]$
$T_{trm}[E]=[110,111,011,010,000,001,101,100]$
$T_{trm}[F]=[110,010,000,100,101,001,011,111]$
$T_{trm}[G]=[101,111,110,100,000,010,011,001]$
$T_{trm}[H]=[101,100,000,001,011,010,110,111]$
$T_{trm}[I]=[101,001,011,111,110,010,000,100]$
$T_{trm}[J]=[011,001,000,010,110,100,101,111]$
$T_{trm}[K]=[011,010,110,111,101,100,000,001]$
$T_{trm}[M]=[011,111,101,001,000,100,110,010]$
$T_{ind}[A]=[B, C, C, J, J, I, I, E]$
$T_{ind}[B]=[C, A, A, H, H, D, D, M]$
$T_{ind}[C]=[A, B, B, F, F, K, K, G]$
$T_{ind}[D]=[E, F, F, G, G, M, M, B]$
$T_{ind}[E]=[F, D, D, K, K, A, A, I]$
$T_{ind}[F]=[D, E, E, C, C, H, H, J]$
$T_{ind}[G]=[H, I, I, D, D, C, C, K]$
$T_{ind}[H]=[I, G, G, B, B, J, J, F]$
$T_{ind}[I]=[G, H, H, M, M, E, E, A]$
$T_{ind}[J]=[K, M, M, A, A, F, F, H]$
$T_{ind}[K]=[M, J, J, E, E, G, G, C]$
$T_{ind}[M]=[J, K, K, I, I, B, B, D]$ Specific algorithm will be provided by omitting the process in the bracket in the algorithm 1, setting $i_{M+1}$ at 1 to 8 and replacing a table $PT_{trm}[p]$ for address reference with $T_{trm}$.

(2) Hilbert Scanning for Filling Rectangular Parallelepiped Regions

According to the invention, the above-described three-dimensional Hilbert scanning for cubes ($2^m \times 2^m \times 2^m$) is extended into a method of scanning that can deal with rectangular parallelepiped regions.

Hilbert scanning normally scans cubic regions and has a limited range of application. The present invention adopts a method for performing three-dimensional pseudo Hilbert scanning on rectangular parallelepiped regions, which method employs a technique based on a sequential process utilizing two kinds of tables. Therefore, it has many advantages over methods of calculation based on a recursive process in terms of calculation time and implementation on a hardware basis.

The extension of cubic implementation to rectangular parallelepiped implementation involves two points, i.e., changing of rules for division of sides during recursive division into eight sections and changing of the assignment of three least significant bits of addresses, Each side is divided according to the following rules during recursive division into eight sections.

(1) A side having an even length is divided into sides having an even length at the dividing point closest to the mid-point.

(2) A side having an odd length is divided into a side having an odd length and a side having an even length at the dividing point closest to the mid point.

According to the rules for division, a line segment having a length $a \cdot 2^m$ is divided into $2^m$ line segments having a length "a" result of m times of division into two sections. Therefore, when a line segment length l satisfies $2 \times 2^m \leq l < 4 \times 2^m$, l is divided into $2^m$ line segments which are combinations of line segment lengths of 2, 3 and 4 as a result of m times of division into two sections. Therefore, in the case of a rectangular parallelepiped region whose side lengths $l_x$, $l_y$ and $l_z$ satisfy:

$$2 \times 2^m \leq l_x < 4 \times 2^m,\ 2 \times 2^m \leq l_y < 4 \times 2^m,\ 2 \times 2^m \leq l_z < 4 \times 2^m, \tag{1}$$

rectangularlar parallelepipeds having sides with lengths which is a combination of 2, 3 and 4 are generated as a result of m times of eight sections (hereinafter, such rectangular parallelepipeds as minimum units are referred to as "blocks")

In the case of a rectangular parallelepiped that satisfies the Equation (1), blocks which satisfy scanning conditions (1)

that the starting and end points must exist on the same side of a block and (2) that movement is to be made to a lattice points for which the humming distance between the addresses is 1 have sides whose lengths are twelve combinations (2×2×2), (2×3×2), (2×2×4), (2×4×2), (4×2×2), (2×3×4) (4×3×2) (2×4×4) (4×2×4) (4×4×2), (4×3×4) and (4×4×4) when expressed by the ($l_x × l_y × l_z$) notation.

In the case of a cubic ($2^m × 2^m × 2^m$), only a block (2×2×2) was generated by dividing it.

Reassignment of the least significant bits of addresses is required for a rectangular parallelepiped because blocks generated therefrom as a result of division are different from those generated from a cube.

The address of each block is stored in a terminal table $PT_{trm}[p][\gamma][i]$ where p (=1, 2, ..., 12) is a number assigned to each block and where $\gamma$ and i are the same as those in $T_{trm}$. For example, for a block of (2×2×4), $PT_{trm}[3][A][16]=1000$ is referred to.

The number 3 which is the first argument of the table is a number that represents the block of (2×2×4).

Therefore, m times of scanning for division into eight sections is performed on a rectangular parallelepiped that satisfies Equation 1 as in the case of a cube, and addresses can be assigned to the rectangular parallelepiped region by referring to the addresses thereafter on the terminal table $PT_{trm}$ associated with each block.

Algorithm for calculating all addresses in a rectangular parallelepiped region ($l_x^0 × l_y^0 × l_z^0$) that satisfies Equation (1) on a recursive basis is obtained as follows based on such an idea. Here, $l_x^k × l_y^k × l_z^k$ represents the length of each side as a result of k times of division.

A description will now be made on the algorithm 1 for a Hilbert address ($\gamma_1, l_x^0, l_y^0, l_z^0, m$)

For $i_1$=1, 2, ... 8

$z_1 = T_{trm}[\gamma_1][i_1]; \gamma_2 = T_{ind}[\gamma_1][i_1];$

{the region ($l_x^0, l_y^0, l_z^0$) is divided according to the rules for division to determine the lengths $l_x^1, l_y^1$ and $l_z^1$ of the sides of the divided regions associated with $z_1$}

For $i_m$=1, 2, ... 8

$Z_m = T_{trm}[\gamma_m][i_m]; \gamma_{m+1} = T_{ind}[\gamma_m][i_m];$

{the region ($l_x^{m-1}, l_y^{m-1}, l_z^{m-1}$) is divided according to the rules for division to determine the lengths $l_x^m, l_y^m$ and $l_z^m$ of the sides of the divided regions associated with $z_m$}

{a block (p) associated with $l_x^m, l_y^m$ and $l_z^m$ is determined}

For $i_{m+1}$=1, ... $l_x^m × l_y^m × l_z^m$ $Z_{m+1} = PT_{trm}[p][\gamma_{m+1}][i_{m+1}];$ Output<$z_1 ... Z_m Z_{m+1}$>

Let us assume here that the total number of the lattice points in a scanned region is $l_x^0 × l_y^0 × l_z^0 = LN$. Then, the algorithm requires an amount of calculation O(LN) which is only about twice LN.

While the invention can not be compared with the generalization of Hilbert scanning utilizing a recursive process (the article (1) on the prior art) because no specific method has been described for three-dimensional applications, it takes computing time significantly longer than that of the inventive method because it involves complicated processing including a recursive process as in two-dimensional applications.

There is one-to-one correspondence between the order of a one-dimensional series obtained by Hilbert scanning and the addresses of lattice points in a three-dimensional space, and it is therefore possible to derive one from the other. No description will be made here on the specific method because it is the same as that disclosed in the article (2) on the prior art The inventive method is limited to the following conditions as described above.

(1) (the length of the shortest side)≦(the length of the longest side)≦2×(the length of the shortest side)

(2) The length of the side on which the start and end points and the lengths of sides of planes excluding the start and end points in the normal direction are odd lengths.

A size out of the range defined by (1) above can be substantially covered by arranging rectangular parallelepipeds in sizes that satisfy (1) in series.

While the above item (2) must be addressed in the future to extend the application to arbitrary sizes without limitation, the problem can be solved by adding scanning of one line at edges of images.

According to the inventive method, the recursive process is eliminated by using two kinds of tables.

Table 1 summarizes the storage capacities of those tables.

TABLE 1

| Scanned Object | Storage Capacity (bytes) |
| --- | --- |
| Cubes | 34 |
| Rectangular parallelepipeds (not utilizing symmetry) | 2280 |
| Rectangular parallelepipeds (utilizing symmetry) | 495 |

Tables required for cube filling scan are the two kinds of tables (terminal table and induction table) described in the section of "Hilbert scanning for filling cubic regions". While it has been necessary to add a table of address information of each block for three-dimensional pseudo Hilbert scanning, the utilization of symmetry of curves as shown in FIG. 8 makes it possible to reduce the capacity for storing the table significantly. Table 1 indicates that the increase of the storage capacity can be suppressed to about ⅕ when symmetry is utilized. Thus, the table can be configured with a quite small storage capacity also in the case of rectangular parallelepipeds. A table showing the order of three-dimensional pseudo Hilbert scan generated from the above-described two kinds of tables is referred to as "look-up table".

A method for compressing information according to the invention will now described.

In a moving image, Z frames of images having X×Y pixels form a rectangular parallelepiped of X×Y×Z when viewed three-dimensionally. A technique for compressing moving images at a high speed and with high image quality is provided here utilizing three-dimensional pseudo Hilbert scanning performed by the rectangular parallelepiped filling scan portion 6 based on a look-up table as described above. A dividing process based on thresholds is carried out on one-dimensional data decompressed by X×Y×Z three-dimensional pseudo Hilbert scanning.

The dividing process will now be described.

An average value Xi of N pixel values of i-th to (N−1)-th pixels of one-dimensional data {$x_i$, i=1, 2, ..., SIZE} is as follows.

$$\bar{x} = \frac{1}{N}\sum_{j=0}^{N-1} x_{i+j}$$

where N is not a predetermined value and is determined with reference to an error as described below. An accumulative square error ei(N) between the average value X and a part of the original one-dimensional data $\{x_i, i=0, 1, \ldots, (N-1)\}$ is as follows.

$$e_1(N) = \sum_{j=0}^{N-1} (x_{i+j} - \bar{x})$$

One section is defined by pixels up to the (N−1)-th pixels for which $e_i$ exceeds a threshold THRE given in advance. This process is sequentially performed from the beginning of the one-dimensional data. The compression algorithm is as follows. A subprogram GROUPING determines dividing points based on evaluated values. SIZE represents the total number of pixels, and THRE represents a threshold for the criterion $e_i$.

[Compression Algorithm]
Main ( )
{
One dimensional data $\{x_i, i=1, 2, \ldots, SIZE\}$ is obtained through rectangular parallelepiped filling scan.
k=1: i=1:
while (i≦SIZE)
{
Grouping (i, N, $\bar{x}$):
$l_k$=N: $C_k$=x: k++:
i=i+N:
}
K=k−1;
$\{l_k\}$ and $\{C_k\}$ are encoded and output (k=1, 2, . . . , K);
}
subgrouping (i, N, x)
{
for (j=1: j≦SIZE; j++)
{
the average value x of $\{x_i, x_{i+1}, \ldots, x_{i+j}\}$ is calculated;

$$e_1(N) = \sum_{m=0}^{j} (x_{i+m} - \bar{x})^2;$$

if ($e_i$(N)>THRE) break;
}
N=j;
}

Other distances such as a city block distance (absolute value) may be used.

Figure 10:
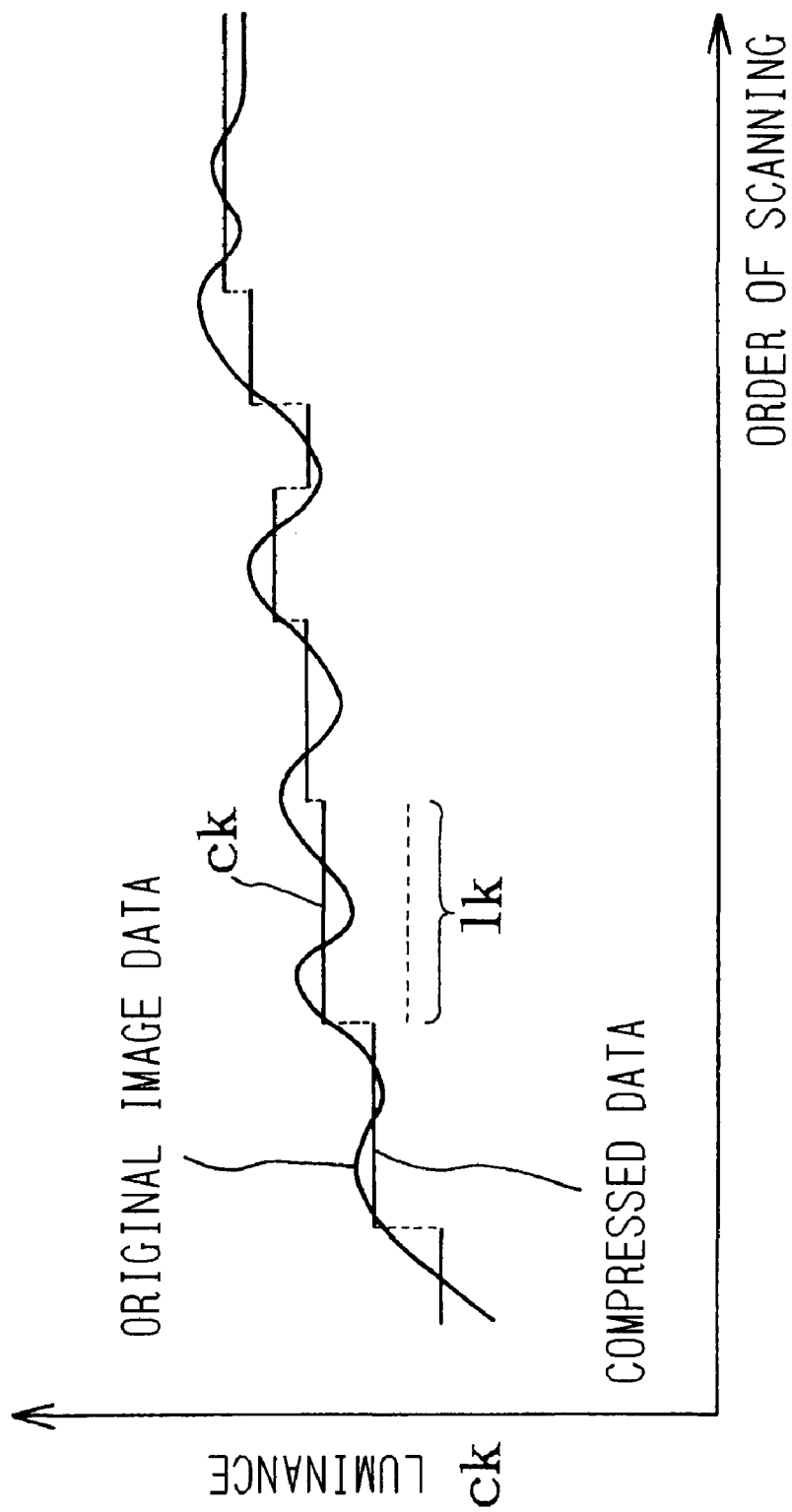
FIG. 10 is a graph showing the relationship between original image data and compressed data.

FIG. 10 shows the relationship between the compressed data thus obtained and the original image. The compressed data are represented by a luminance value $C_k$ and the length (number) $l_k$ over which the luminance value lasts.

The compressed data can be restored through a simple process of burying information of $\{l_k\}$ and $\{C_k\}$ in a moving image regarded as a rectangular parallelepiped along three-dimensional pseudo Hilbert scanning performed by the rectangular parallelepiped filling scan portion 17. The algorithm for restoring moving image data is as follows. The filtering process at the filtering process portion 14 is a conventional technique. For example, a smoothing filter is used.

[Restoration Algorithm]
Main
{
$l_k$ and $\{C_k\}$ are decoded (k=1, 2, . . . , K):
$\{C_k\}$ is decompressed over the length $\{l_k\}$ along the three-dimensional pseudo Hilbert scanning performed by the rectangular parallelepiped filling scan portion 17;
The filtering process is carried out.
}

A description will now be made with reference to FIG. 12 on the detection of divided sections at the divided section detection portion 8 of the data compression portion 6.

Let us assume that THRE=10. First, the accumulative error is sequentially checked from the point 1 to determine a first section.

(1) Since $x_1$=5, the average value x and accumulative error e are calculated at x=6 and e=2 when j=1, i.e., when the point $x_2$=7 is included. Then, the next point is checked because e<THRE at this time.

(2) The average value x and accumulative error e are calculated at x=7 and e=8 when j=2, i.e., when the point $x_3$=9 is included. Then, the next point is checked because e<THRE at this time.

(3) The average value x and accumulative error e are calculated at x=7 and e=8 when j=3, i.e., when the point $x_4$=7 is included. Then, the next point is checked because e<THRE at this time.

(4) The average value x and accumulative error e are calculated at x=6 and e=28 when j=4, i.e., when the point $x_5$=2 is included. The points $x_1, x_2, x_3$ and $x_4$ are in the same section because e>THRE at this time (N=4).

Since the first section has been thus determined, a second section is determined from the point 5.

(1) Since $x_5$=2, the average value x and accumulative error e are calculated at x=3 and e=2 when j=1, i.e., when the point $x_6$=4 is included. Then, the next point is checked because e<THRE at this time.

(2) The average value x and accumulative error e are calculated at x=3 and e=2 when j=2, i.e., when the point $X_7$=3 is included. Then, the next point is checked because e<THRE at this time.

(3) The average value x and accumulative error e are calculated similarly for j=3, 4, . . . , the results being compared with THRE. Then the points for which e>THRE define the same section. The points $x_5, x_6, x_7$ and $x_8$ are in the same section.

Thus, the second section is determined

The above-described process is repeated to cover the number of data SIZE.

Figure 11:
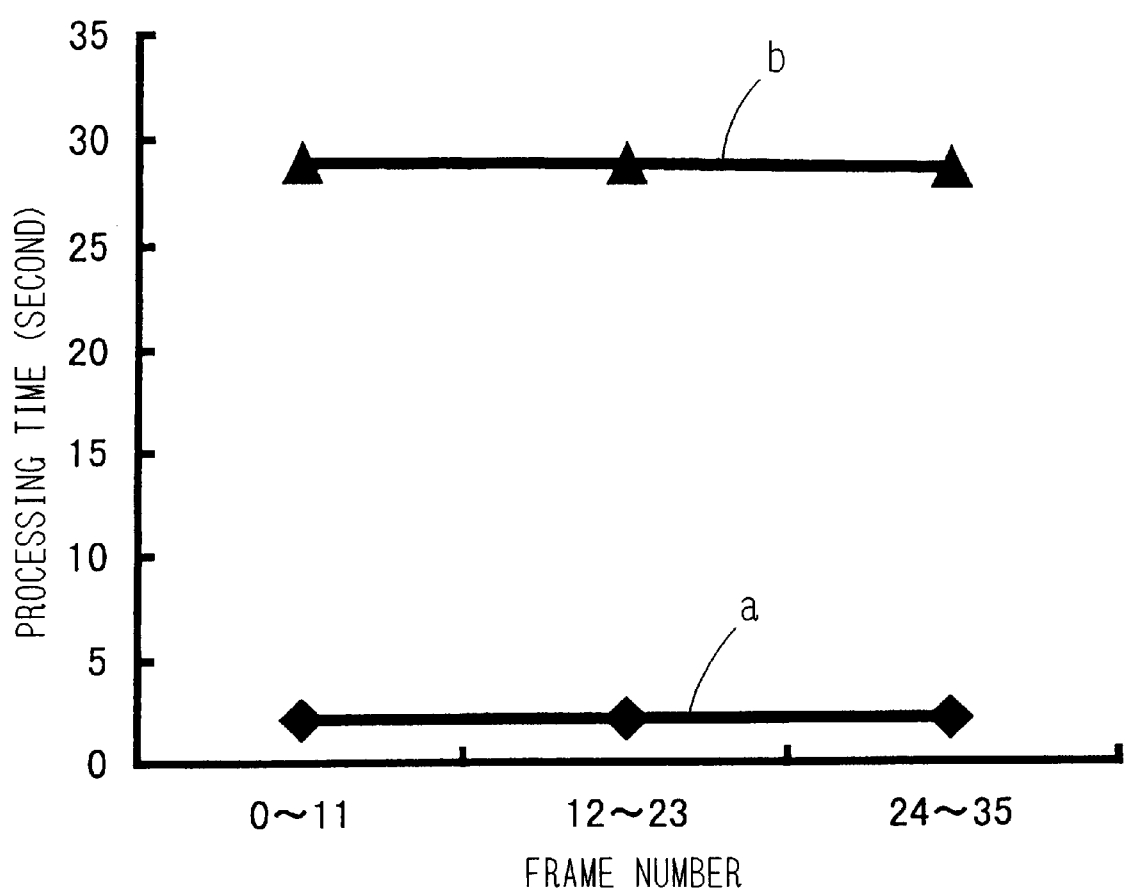
FIG. 11 is a block diagram showing a system configuration to achieve high image quality utilizing an error table.

The method for compressing image information at a high speed according to the invention makes it possible to improve the efficiency of the compression of image information as shown in FIG. 11. The image shown here is only Miss America (360×288 pixels/frame) with a compression ratio of 0.19 bits/pixel (only for luminance).

Specifically, the horizontal axis and vertical axis of FIG. 11 respectively represent frame numbers and processing time (in seconds); the graph "a" represents compression of image information according to the invention; and the graph b represents compression of image information according to the prior art (MPEG: Moving Image Experts Group: Moving Image Coding Experts Group which are international standard systems for compression of moving images).

As apparent from the figure, the processing time is approximately 2.5 seconds according to the invention and approximately 28 seconds according to the prior art, and the processing time can therefore be shortened by a factor of about ten.

A reduction in image quality can occur depending the magnitude of the threshold THRE used for averaging during data compression. Specifically, a large threshold THRE results in a reduction in image quality, although it increases the compression ratio. A small threshold THRE decreases the compression ratio to increase transfer time, although it improves image quality. A description will now be made on a technique which can satisfy the requirements on both of the compression ratio and image quality while suppressing any reduction in image quality associated with an increase in the threshold THRE.

Figure 12:
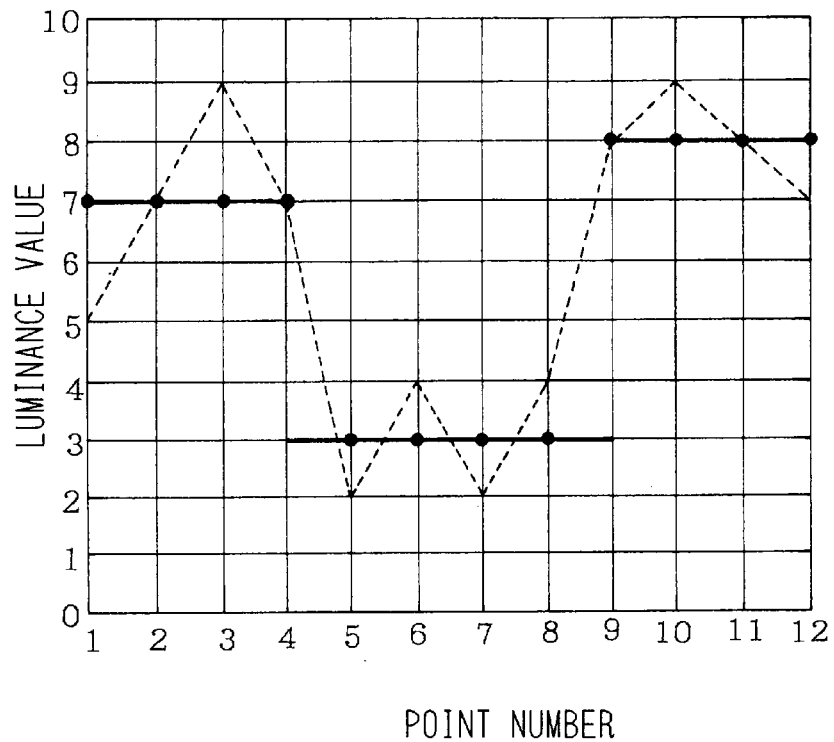
FIG. 12 is a graph showing the relationship between original one-dimensional data and an average value in each section used in the above-described method for compression.

FIG. 12 shows the relationship between original one-dimensional data and the average value of each section used in the above-described method for compression.

Figure 13:
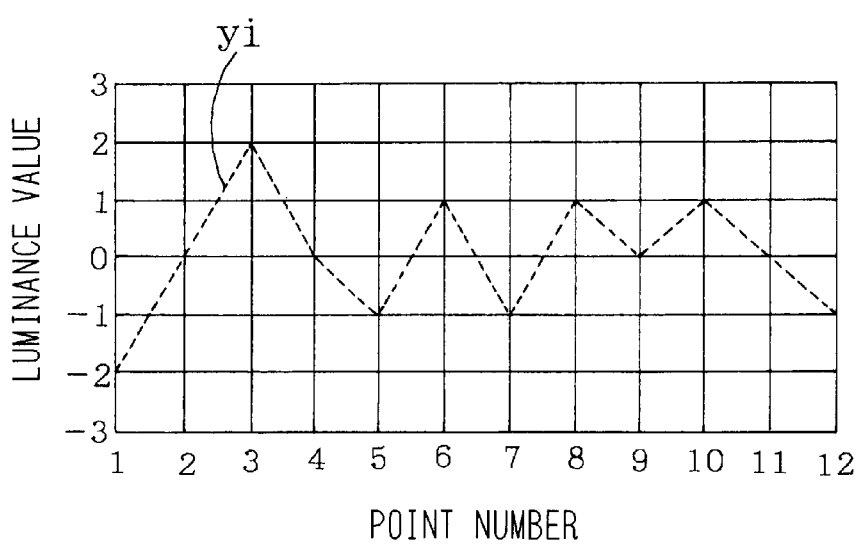
FIG. 13 is a graph showing approximated error data.
Figure 14A:
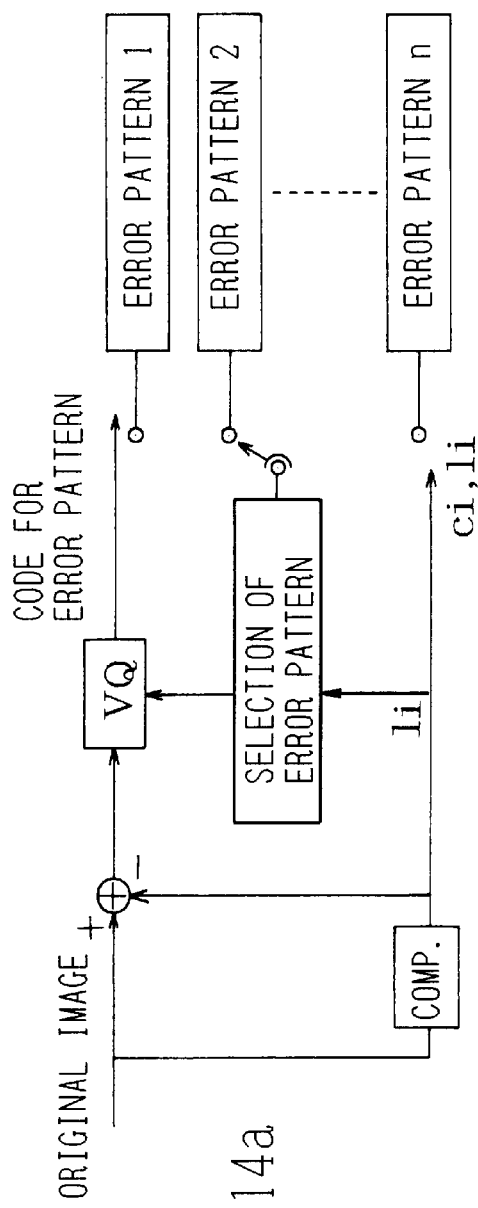
FIG. 14 is a block diagram showing a system configuration to achieve high image quality utilizing an error table.
Figure 14B:
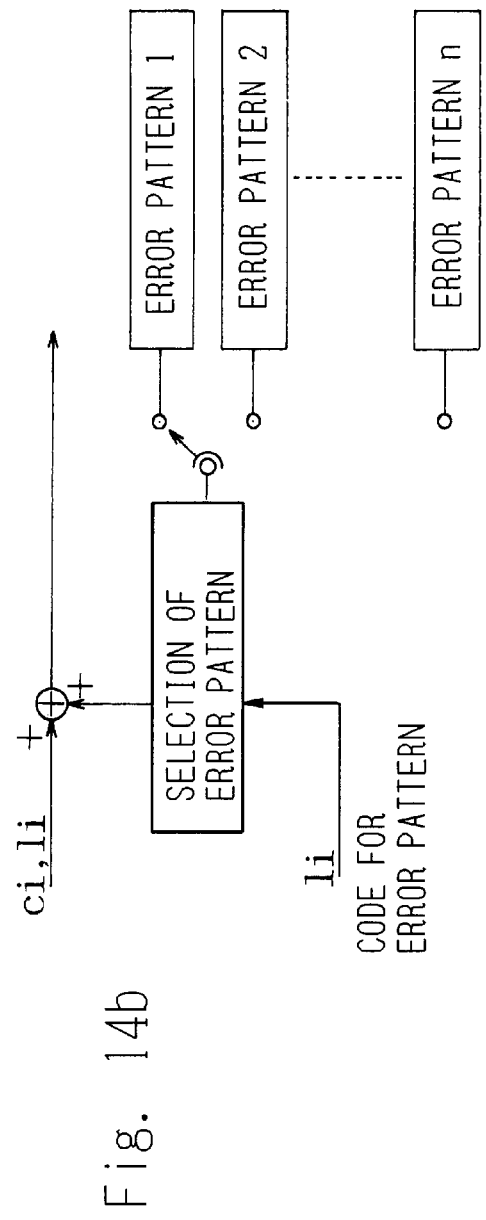

This is approximated error data $\{y_i, i=1, 2, \ldots, SIZE\}$ as shown in FIG. 13. A plurality of such patterns of approximated error or error patterns are prepared at a server end and clients. A code for an error pattern that approximates a differential waveform during data compression at the server is transferred to the clients along with the compressed data. At the clients, the waveform of the relevant error pattern is superimposed on the decompressed data during data decompression to restore the data. FIG. 14 shows a configuration to implement this method. FIG. 14(a) shows a compression operation at a server, and FIG. 14(b) shows a restoring operation at clients.

This makes it possible to provide moving images with high image quality.

While the above-described embodiment has described conversion of viewed moving images into one-dimensional serial information with reference to a method involving three-dimensional pseudo Hilbert scanning, the conversion may be carried out using other methods.

Figure 15:
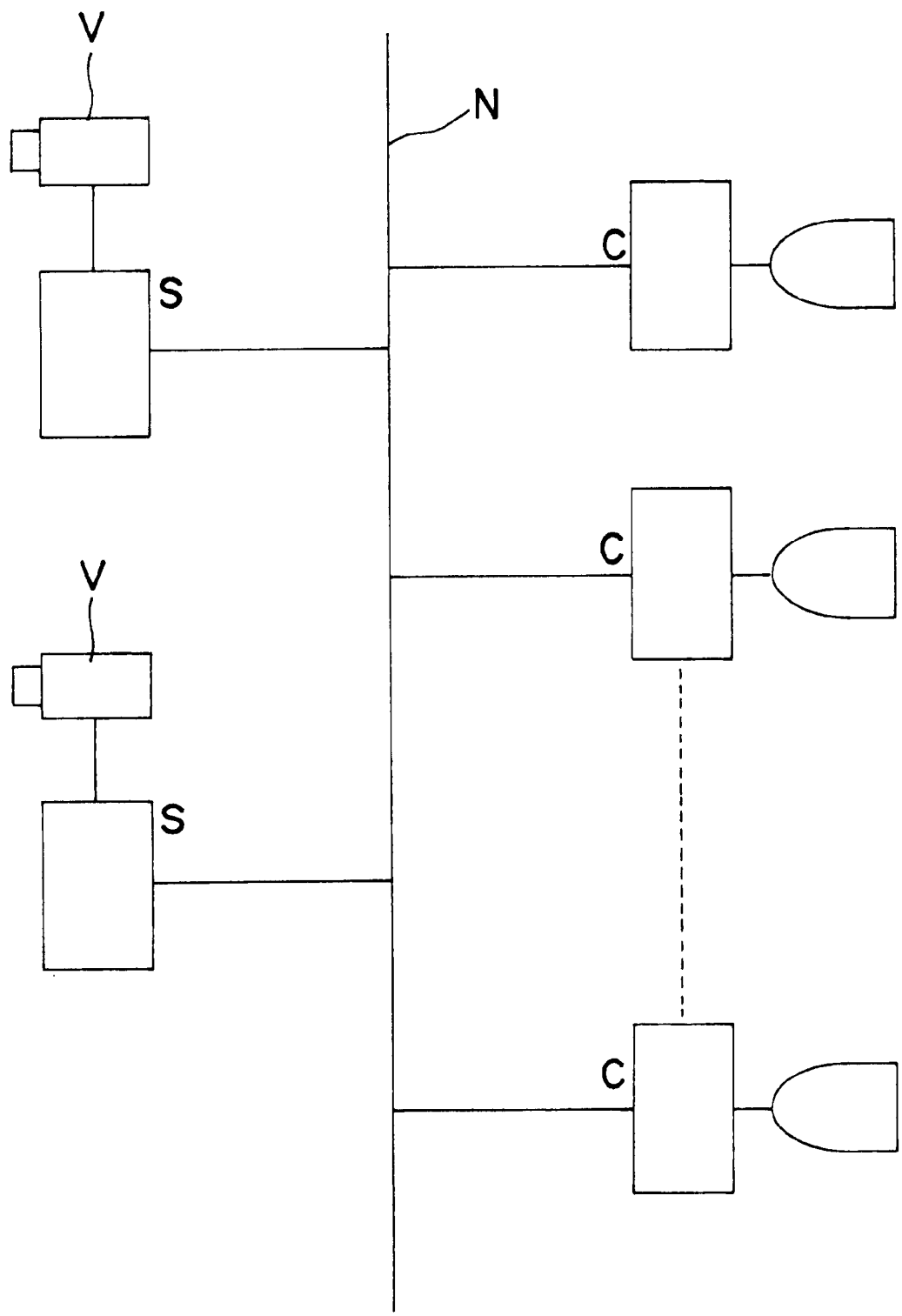
FIG. 15 is a configuration diagram of a system according to the invention constituted by a network.

A description will now be made on a method for transferring real-time dynamic images utilizing the method for compressing image information at a high speed according to the invention. FIG. 15 is a configuration diagram of a system according to the invention constituted by a network N such as a LAN (intranet) or internet, and FIG. 16 is a diagram showing an example of a process flow according to the inventive method.

According to the invention, a plurality of computers connected through the network N are prepared. At least one of them is a moving image transferring end (hereinafter "server S") at which a video capture card and a video camera V are set. The other computers are clients C. According to the invention, a moving image is transferred by the following process.

(1) A server program is executed on the server(s) S.
(2) A client program is executed on the clients C.
(3) Connection is established from the clients C to any server S (there may be a plurality of servers).
(4) The clients C request images in standard specifications from the server S.
(5) The server S continues sending the requested moving images to the clients C.
(6) The clients C change the contents of the request as needed.
(7) The server S generates, switches or deletes a compression and transfer sled accordingly.

Figure 16:
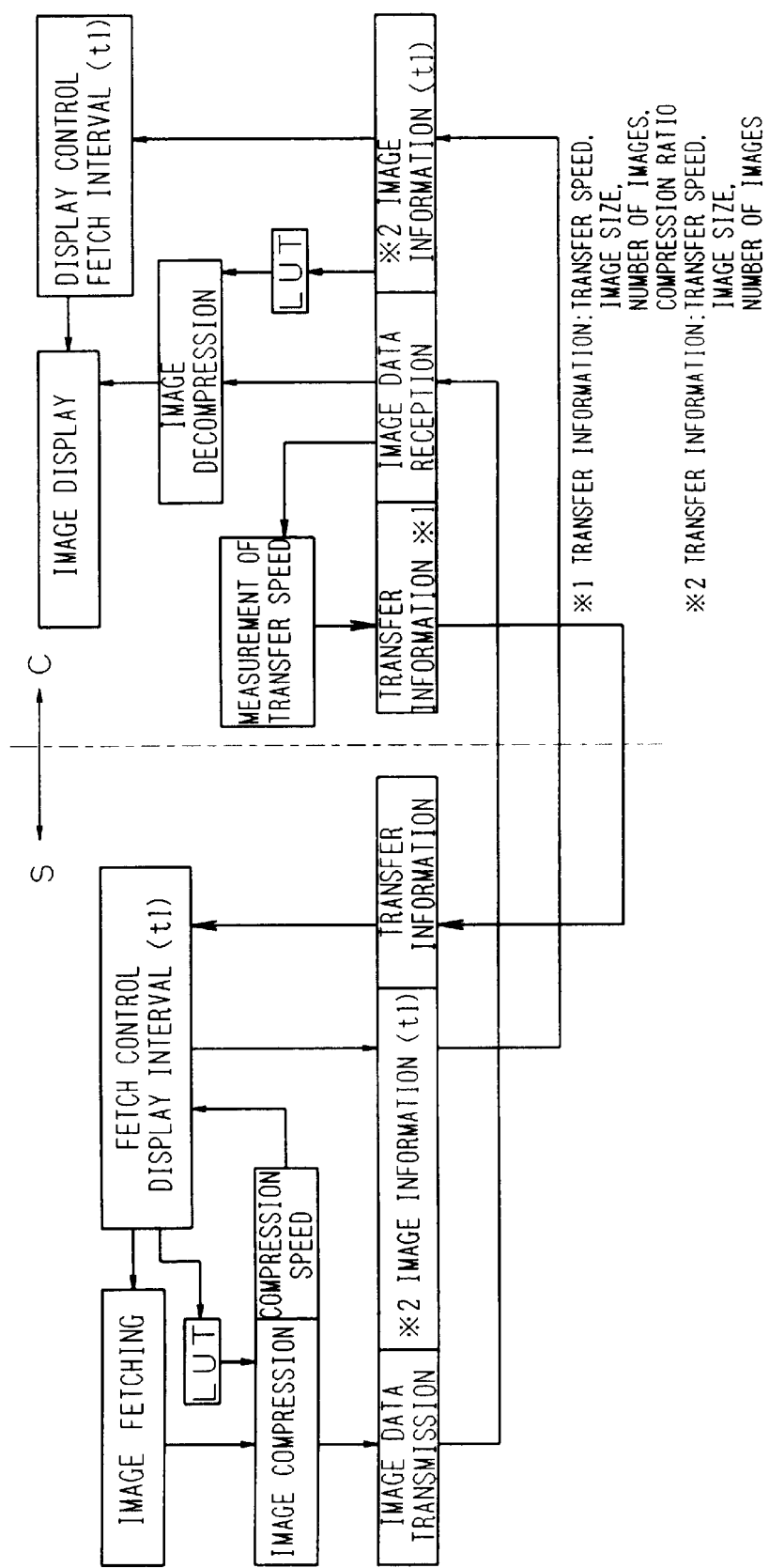
FIG. 16 is a diagram showing a process flow according to a method of the invention.

Specifically, as shown in FIG. 16, the clients C transmits information on the transfer speed, image size, the number of images and the like to the server S, and the transfer speed information is fetched and set as a control display interval t1. Next, the server S fetches image signals from a television camera at the above-described display interval t1 with means such as video capture and performs image compression on the fetched images using a look-up table LUT to achieve the compression speed, image size and the number of images in accordance with the display interval t1 and transmits the image data to the clients along with the fetch interval information t1. The computers at the clients C decompress the compressed images using the look-up table LUT and display the images on the display at the fetch interval t1. They also measures the transfer speed as they receive the image data and transmit transfer speed information to the server S. The server S updates the display interval t1 with a value in accordance with the transfer speed information to fetch images in accordance with the characteristics of the clients C such as image processing speed.

The present invention will now be specifically described with reference to the embodiment.

Figure 17:
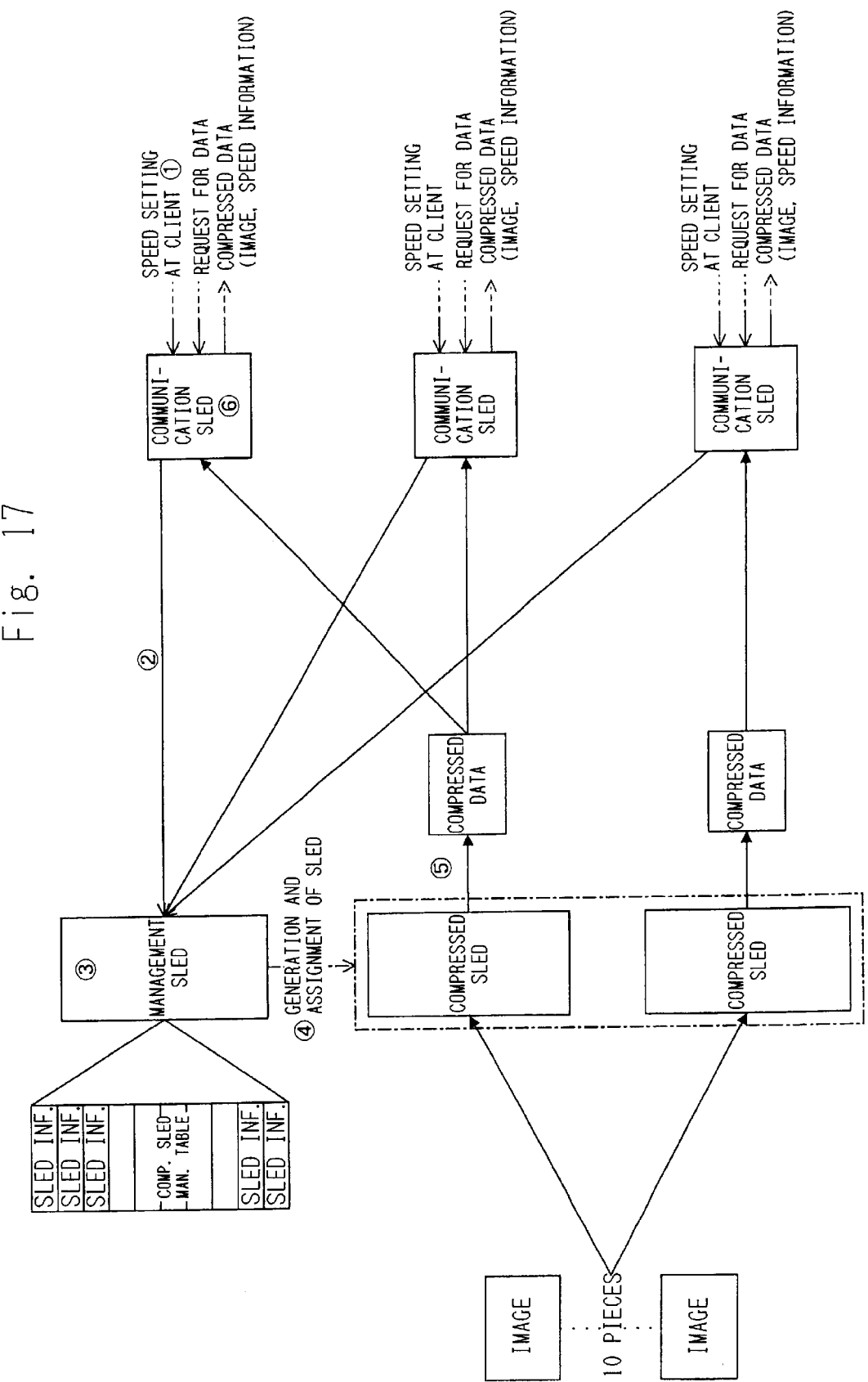
FIG. 17 us a block diagram showing an initializing process at the time of connection between a server who transmits images and a client.

FIG. 17 is a block diagram showing an initializing process at the time of connection of the image transmitting server to the clients. The process proceeds as follows. The speed setting is received from the clients.

(2) The contents of the setting are informed to a management sled.
(3) A sled in compliance with the contents of setting is retrieved from a management table.
(4) If a sled having the same setting exists, the existing slid is assigned. If not, a new compression sled is generated and assigned.
(5) Compression data including speed information is generated.
(6) Compressed data on the assigned compression sled are transmitted to the clients.

Figure 18:
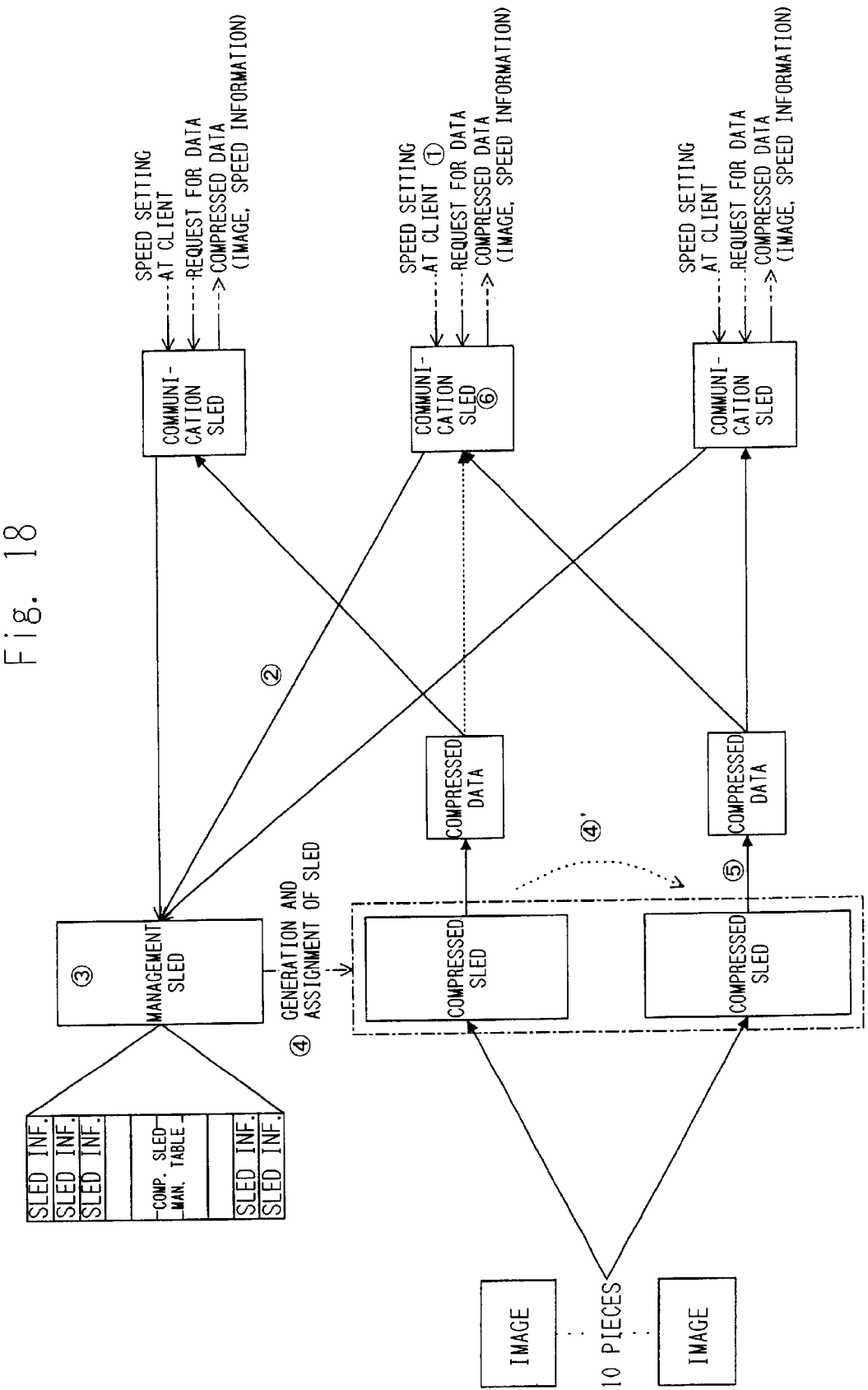
FIG. 18 is a block diagram showing a setting alteration process after the image transmitting server begins the transmission of moving images.
Figure 19:
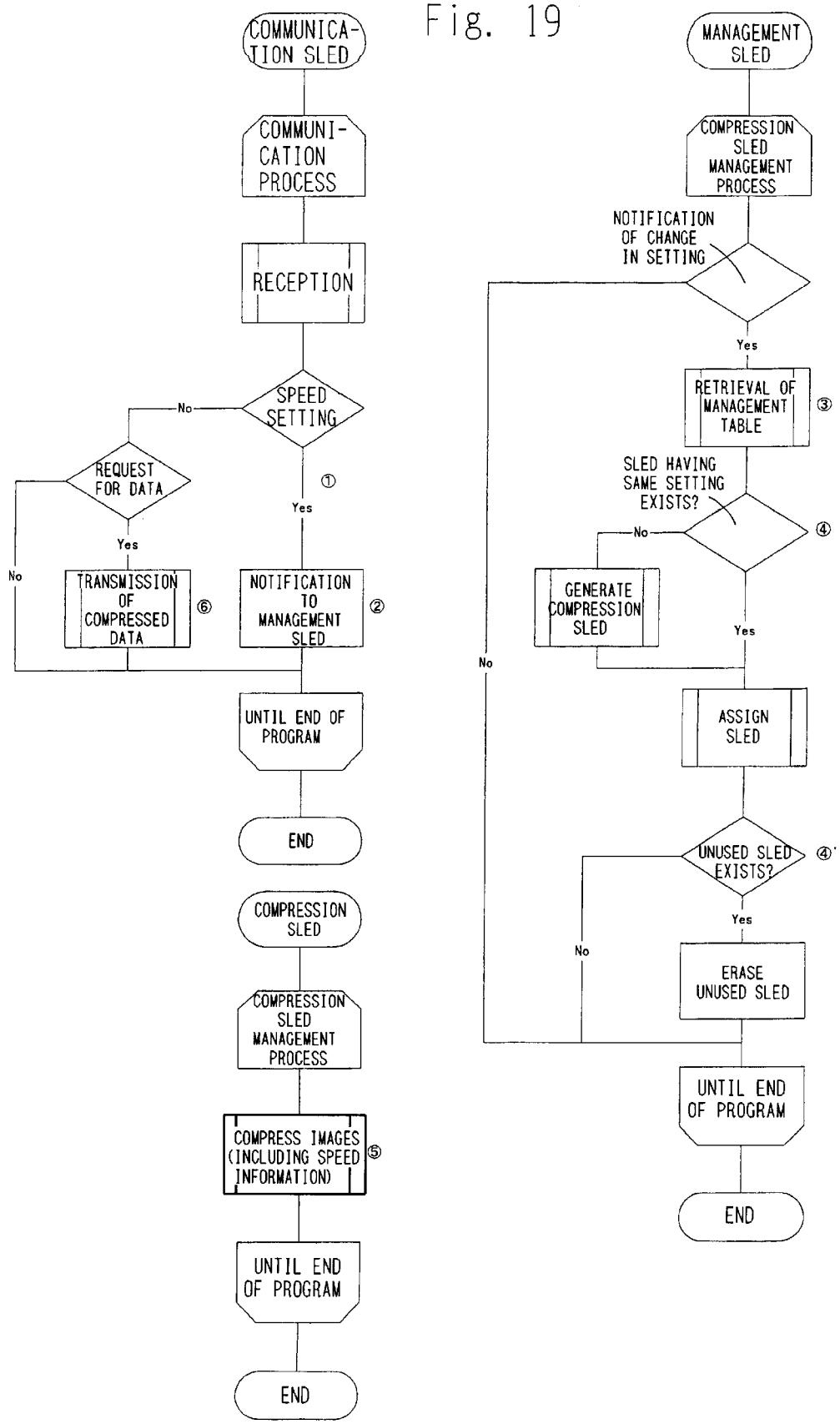
FIG. 19 is a flow chart for the setting alteration process after the image transmitting server begins the transmission of moving images.

FIG. 18 is a block diagram showing a process of changing setting after transmission of a moving image is started at the image transmitting server. FIG. 19 is a flow chart of the same, and the process proceeds as follows.

(1) The speed setting is received from the clients.
(2) The contents of the setting are informed to the management sled.
(3) A sled in compliance with the contents of setting is retrieved from the management table.
(4) If a sled having the same setting exists, the existing sled is assigned. If not, a new compression sled is generated and assigned.
(4') Unused compression sleds are erased simultaneously.
(5) Compression data including speed information is generated.
(6) Compressed data on the assigned compression sled are transmitted to the clients.

Figure 20:
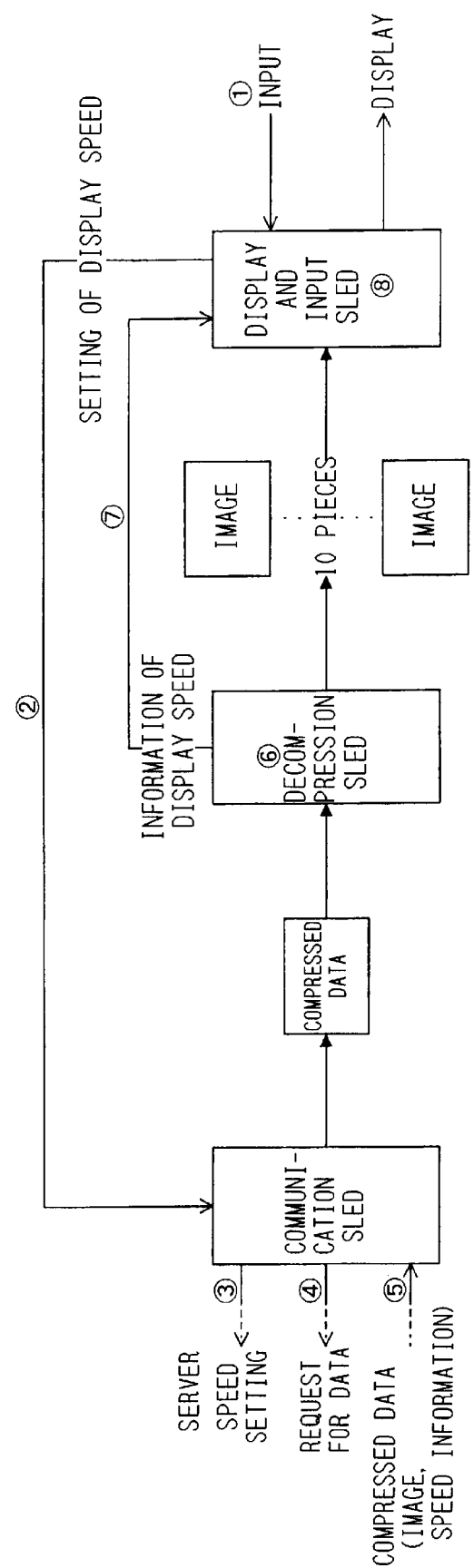
FIG. 20 is a block diagram showing a configuration of a client who receives images.
Figure 21:
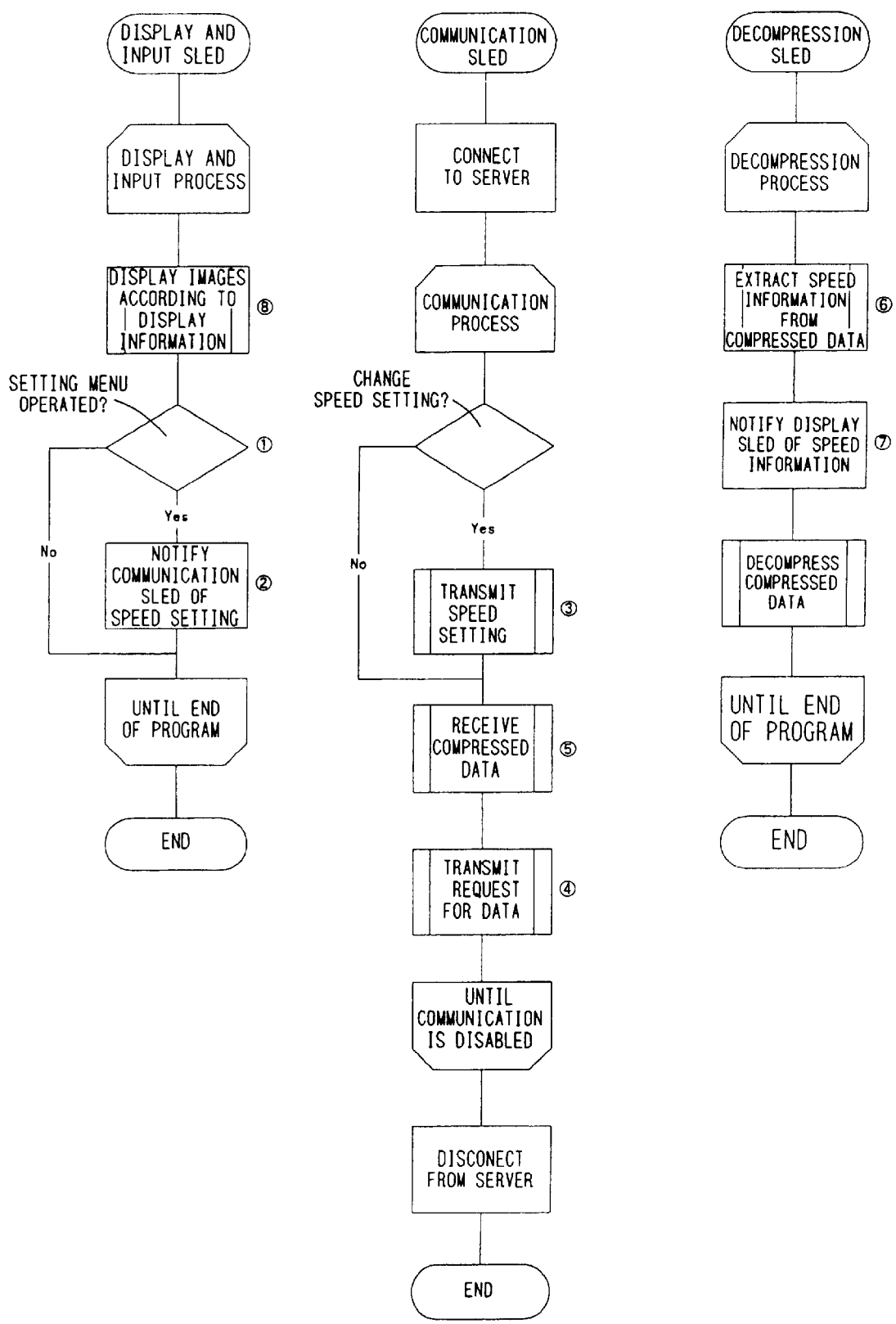
FIG. 21 is a flow chart showing processes at the image receiving client.

FIG. 20 is a block diagram showing a configuration of a client that receives images, and FIG. 21 is a flow chart showing the process which proceeds as follows.

(1) Speed is input from a setting menu.
(2) The contents of the setting are informed to a management sled.
(3) The contents of the setting are transmitted to the server.
(4) The next request for compressed data is transmitted.
(5) The compressed data are received.
(6) Speed information is extracted from the compressed data.
(7) The speed information is set in a display sled.
(8) Images are displayed in accordance with the speed information.

Figure 22:
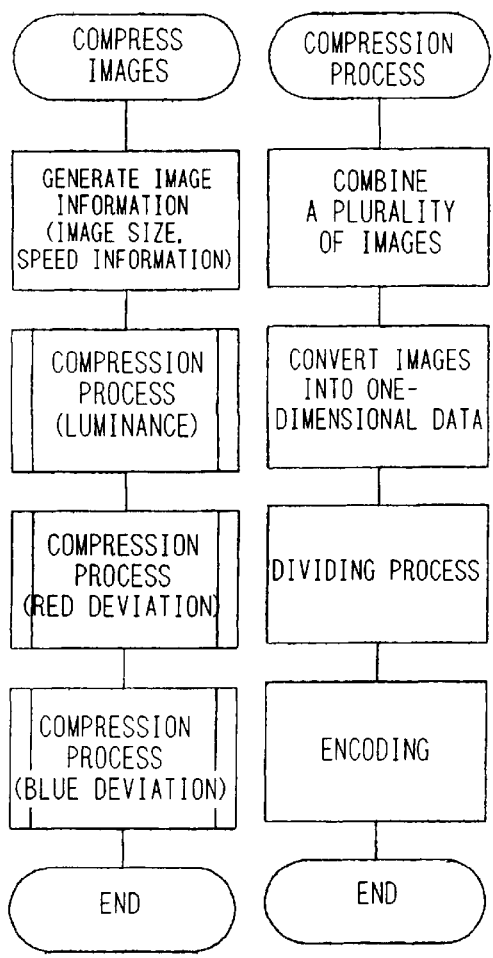
FIG. 22 is a flow chart showing a compression process at the server.

FIG. 22 is a flow chart of the compression process at the server. At this compression process, a process of compressing image signals and a compression process for increasing transmission speed are performed simultaneously. Images are compressed by creating image information including speed information image size and compressing each of a luminance signal, a red deviation signal and a blue deviation signal. In the compression process to increase the transmission speed, a plurality of images are combined into a three-dimensional image, and the image is then converted into one-dimensional data, subjected to a dividing process and encoded to be transmitted to the clients.

Figure 23:
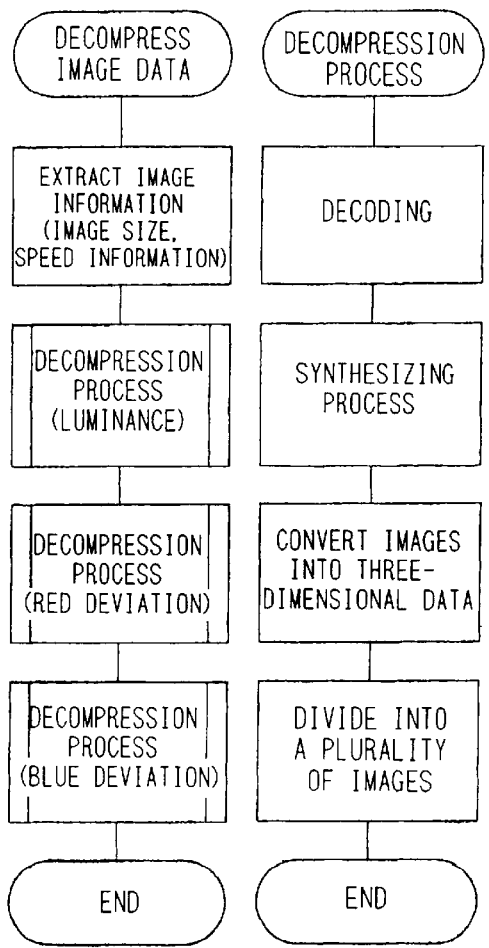
FIG. 23 is a flow chart showing a decompression process at the client.

FIG. 23 is a flow chart for a decompression process at the clients. At the decompression process, a process of decompressing compressed image signals and a process of decompressing compressed transmission signals are performed simultaneously. The compressed data are decompressed by extracting image information including the image size and speed information and decompressing each of a luminance signal, a red deviation signal and a blue deviation signal. The process of decompressing compressed transmission signals involves composition, a synthesizing process, a process of converting them into three-dimensional data and a process of dividing them into a plurality of images to display original images on the display.

As described above, the method for compressing image information at a high speed according to the invention provides the following effects.

Since a technique based on a sequential process utilizing a look-up table associated with rectangular parallelepiped regions in a three-dimensional space is employed, it is possible to avoid a reduction in throughput and an increase in the cost resulting from common recursive calculations.

Especially, a technique for compressing moving image information at a high speed and quality for processes on moving images can be provided at a low cost.

Moving image information is an enormous amount of information, and such an enormous amount of information is subjected to three-dimensional rectangular parallelepiped filling scan to convert the three-dimensional information into one-dimensional series having high neighborhood retaining properties, thereby compressing the moving images properly. Further, redundancy of moving images can be properly eliminated.

Thus, it is possible to establish a more practical process of compressing moving image information associated with rectangular parallelepiped regions in a three-dimensional space. Especially, the use of the compression and restoration processes with a reduced time, the conversion process utilizing hierarchy and compression parameters less dependent on images can significantly contribute to the development of digital image compression techniques.

According to the inventive method for transferring real-time moving images, the use of a look-up table showing the order of scan generated from two kinds of tables makes it possible to reduce compression speed significantly and to perform real-time compression of images. By dynamically generating arbitrary compression and transfer sleds for different images sizes and different numbers of images, different requirements can be satisfied. By automatically generating a sled for selecting, compressing and transferring arbitrary images on different time bases, requests for transfer of images at different time intervals can be matched to the speed of a network. Since it is completely software-based, the performance of a CPU is reflected thereon, and an increase in the processing speed of the CPU allows corresponding increases in the image size and the number of images.

The method for compressing image information at a high speed according to the invention is not limited to the above-described embodiment, and various modification is possible based on the principle of the invention without departing from the scope of the invention.

INDUSTRIAL APPLICABILITY

The present invention can be used in the field of image compression and the transfer of real-time moving images.

What is claimed is:

1. A method for compressing image information at a high speed, comprising:

converting viewed moving images comprising three-dimensional information into one-dimensional serial information one by one using a look-up table associated with rectangular parallelepiped regions in a three-dimensional space;

subjecting the converted data to data compression;

dividing and classifying patterns of differential waveforms between the compressed data and the original data into a plurality of models to prepare error patterns;

adding codes for error patterns that approximate the differential waveforms at the time of data compression to the compressed data; and restoring the data by superimposing the waveforms of the error patterns associated with the codes of the relevant error patterns on decompressed data during data decompression.

2. A method for compressing image information according to claim 1, wherein the conversion of the viewed moving images into one-dimensional serial information is performed through three-dimensional pseudo Hilbert scanning.

3. A method for compressing image information according to claim 2, further comprising defining rules for recursive division of each side of a rectangular parallelepiped block as the minimum unit for said three-dimensional pseudo Hilbert scanning such that a side having an even length is divided into sides having an even length at a dividing point closest to the mid-point; a side having an odd length is divided into a side having an odd length and a side having an even length at a dividing point closest to the mid-point; and addresses are assigned to the rectangular parallelepiped regions accordingly.

4. A method for compressing image information according to claim 2, wherein the data compression is a process of dividing one-dimensional data decompressed through three-dimensional pseudo Hilbert scanning using a threshold.

5. A method for compressing image information according to claim 4, wherein the dividing process divides the one-dimensional data into sections that result in the minimum square error from said one-dimensional data and generates compressed data which is linear approximation of each of said sections.

6. A method for transferring viewed moving images from a server to clients in real time, comprising:

converting viewed moving images comprising three-dimensional information into one-dimensional serial information one by one using a look-up table associated with rectangular parallelepiped regions in a three-dimensional space;

compressing the converted original data using a software compression technique;

transferring the compressed converted original data through a communication path;

dividing and classifying patterns of differential waveforms between the compressed approximate data and the original data into a plurality of models to prepare error patterns at each of the server and clients;

transferring codes for error patterns that approximate the differential waveforms at the time of data compression at the server to the clients along with the compressed data; and restoring the data by superimposing the waveforms of relevant error patterns on decompressed data during data decompression at the clients.

7. A method for transferring real time moving images according to claim 6, further comprising dynamically generating a look-up table upon a request from a client.

8. A method for transferring real-time moving images according to claim 7, further comprising using a look-up table on which any image size can be specified as requested by a client.

9. A method for transferring real-time moving images according to claim 7, further comprising using a look-up table on which any number of images can be specified upon request by a client.

10. A method for transferring real-time moving images according to claim 6, further comprising changing the compression ratio of an image upon request by a client.

11. A method for transferring real-time moving images according to any of claim 6 or 8 through 10, further comprising generating a specific compression and transfer sled to each request by a client.

12. A method for transferring real-time moving images according to any of claim 6 or 8 through 10, further comprising changing intervals between images upon request by a client.

13. A method for transferring real-time moving images according to any of claim 6 or 8 through 10, further comprising providing management means for processing a request from each of a plurality of clients simultaneously.

14. A method for compressing image information at a high speed, comprising:

converting photographed moving pictures comprising three-dimensional information into one-dimensional serial information one by one using a look-up table showing an order of scanning rectangular parallelepiped regions in a three-dimensional space;

subjecting the converted data to data compression;

dividing and classifying patterns of differential waveforms between the compressed data and the original data into a plurality of models to prepare error patterns;

adding codes for error patterns that approximate the differential waveforms at the time of data compression to the compressed data; and restoring the data by superimposing the waveforms of the error patterns associated with the codes of the relevant error patterns on decompressed data during data decompression.

15. A method for transferring photographed moving pictures from a server to clients in real time, comprising:

converting photographed moving pictures comprising three-dimensional information into one-dimensional serial information one by one using a look-up table showing an order of scanning rectangular parallelepiped regions in a three-dimensional space;

compressing the converted original data using a software compression technique;

transferring the compressed converted original data through a communication path;

dividing and classifying patterns of differential waveforms between the compressed approximate data and the original data into a plurality of models to prepare error patterns at each of the server and clients;

transferring codes for error patterns that approximate the differential waveforms at the time of data compression at the server to the clients along with the compressed data; and restoring the data by superimposing the waveforms of relevant error patterns on decompressed data during data decompression at the clients.

* * * * *